(12) United States Patent
Wang

(10) Patent No.: US 10,747,372 B2
(45) Date of Patent: Aug. 18, 2020

(54) SYSTEMS AND HIGH THROUGHPUT METHODS FOR TOUCH SENSORS

(71) Applicant: Hailiang Wang, Camarillo, CA (US)

(72) Inventor: Hailiang Wang, Camarillo, CA (US)

(\*) Notice: Subject to any disclaimer, the term of this patent is extended or adjusted under 35 U.S.C. 154(b) by 658 days.

(21) Appl. No.: 14/667,688

(22) Filed: Mar. 25, 2015

(65) Prior Publication Data
US 2016/0282978 A1    Sep. 29, 2016

(51) Int. Cl.
*G06F 3/044* (2006.01)
*B32B 7/12* (2006.01)
*B32B 27/08* (2006.01)
*B32B 27/36* (2006.01)
*B32B 27/30* (2006.01)
*B32B 27/28* (2006.01)
(Continued)

(52) U.S. Cl.
CPC ............... *G06F 3/044* (2013.01); *B32B 7/12* (2013.01); *B32B 27/08* (2013.01); *B32B 27/281* (2013.01); *B32B 27/308* (2013.01); *B32B 27/365* (2013.01); *B32B 37/12* (2013.01); *B32B 38/10* (2013.01); *B32B 2255/10* (2013.01); *B32B 2255/26* (2013.01); *B32B 2264/105* (2013.01); *B32B 2264/108* (2013.01); *B32B 2305/72* (2013.01); *B32B 2307/412* (2013.01); *B32B 2457/208* (2013.01); *G06F 2203/04103* (2013.01)

(58) Field of Classification Search
CPC . G06F 3/044; G06F 2203/04103; B32B 7/12; B32B 37/12; B32B 27/281; B32B 27/308; B32B 27/365; B32B 27/08; B32B 38/10; B32B 2255/10; B32B 2264/105; B32B 2264/108; B32B 2255/26; B32B 2457/208; B32B 2307/412; B32B 2305/72

See application file for complete search history.

(56) References Cited

U.S. PATENT DOCUMENTS 6,090,314 A \* 7/2000 Handa ............... H01C 7/027
                                                           252/511
7,173,778 B2   2/2007 Jing et al.
8,049,333 B2  11/2011 Alden et al.
(Continued)

FOREIGN PATENT DOCUMENTS

EP         2275841 A2    1/2011

OTHER PUBLICATIONS

Office Action from U.S. Appl. No. 15/197,941, dated May 30, 2017.
(Continued)

*Primary Examiner* — Roberto W Flores
(74) *Attorney, Agent, or Firm* — Fikret Kirkbir

(57) ABSTRACT

This disclosure generally relates to an electronic system comprising a touch sensor and a method for manufacturing such system. This disclosure also generally relates to an electronic system comprising a transparent conductive electrode. This disclosure also generally relates to an optoelectronic system including a touch screen. This system may comprise a conductive nano-composite layer, a lamination layer, and a transparent substrate. The conductive nano-composite layer, the lamination layer, and the transparent substrate in combination may have optical transparency higher than 88% at about 550 nm, and sheet resistance lower than 45 ohms per square.

52 Claims, 23 Drawing Sheets

(51) Int. Cl.
*B32B 37/12* (2006.01)
*B32B 38/10* (2006.01)

(56) References Cited

U.S. PATENT DOCUMENTS

| | | |
|---|---|---|
| 8,247,468 B2 | 8/2012 | Yoneyama et al. |
| 8,564,314 B2 | 10/2013 | Shaikh et al. |
| 8,603,574 B2 | 12/2013 | Huang et al. |
| 8,704,112 B2 | 4/2014 | Choi et al. |
| 8,730,179 B2 | 5/2014 | Rosenblatt et al. |
| 8,766,127 B2 | 7/2014 | Chang et al. |
| 8,797,282 B2 | 8/2014 | Lyon et al. |
| 8,803,823 B2 | 8/2014 | Chang et al. |
| 9,207,824 B2 | 12/2015 | Wang |
| 2001/0028977 A1 | 10/2001 | Kazacos et al. |
| 2006/0257638 A1 | 11/2006 | Glatkowski et al. |
| 2008/0035882 A1 | 2/2008 | Zhao et al. |
| 2008/0286447 A1* | 11/2008 | Alden .................. B82Y 20/00 427/108 |
| 2009/0246957 A1 | 10/2009 | Kamimura et al. |
| 2010/0248480 A1 | 9/2010 | Darsillo et al. |
| 2010/0283050 A1 | 11/2010 | Lee et al. |
| 2011/0226694 A1 | 9/2011 | Martin et al. |
| 2012/0141736 A1 | 6/2012 | Hotta et al. |
| 2012/0177920 A1 | 7/2012 | Huang |
| 2013/0044049 A1 | 2/2013 | Biggs et al. |
| 2013/0088779 A1 | 4/2013 | Kang et al. |
| 2013/0095237 A1 | 4/2013 | Kalyankar et al. |
| 2013/0157008 A1 | 6/2013 | Aytug et al. |
| 2013/0164545 A1 | 6/2013 | Evans et al. |
| 2013/0230733 A1 | 9/2013 | Nakamura et al. |
| 2013/0250414 A1 | 9/2013 | Eguchi et al. |
| 2013/0286478 A1 | 10/2013 | Furui et al. |
| 2014/0009834 A1 | 1/2014 | Kalyankar |
| 2014/0021400 A1 | 1/2014 | Coenjarts et al. |
| 2014/0023840 A1 | 1/2014 | Shibayama et al. |
| 2014/0030488 A1 | 1/2014 | Jung et al. |
| 2014/0038109 A1 | 2/2014 | Rahman et al. |
| 2014/0051804 A1 | 2/2014 | Zhou et al. |
| 2014/0144576 A1* | 5/2014 | Jiang .................. B32B 5/12 156/163 |
| 2014/0338735 A1 | 11/2014 | Allemand et al. |
| 2015/0243405 A1* | 8/2015 | Kai .................. G06F 3/044 428/323 |
| 2015/0277616 A1 | 10/2015 | Wang |
| 2016/0041657 A1 | 2/2016 | Wang |
| 2016/0190055 A1* | 6/2016 | Jinbo .................. H01L 27/3276 257/99 |

OTHER PUBLICATIONS

Office Action from U.S. Appl. No. 14/922,368, dated Apr. 21, 2017.
Poor, Alfred "How It Works: The Technology of Touch Screens" Computerworld, Oct. 17, 2012. Printed Mar. 8, 2014. Nine (9) printed pages. http://www.computerworld.com/s/article/9231961/How_it_works_The_technology_of_touch_screens?pageNumber=1.
Walker, Geoff "Fundamentals of Touch Technologies" SID Display Week 2013, Oct. 2013, version 1.3. Printed Mar. 8, 2014. 247 pages. http://www.walkermobile.com/Touch_Technologies_Tutorial_Latest_Version_pdf.
Walker, Geoff "Fundamentals of Touch Technologies" SID Display Week 2014, Jun. 1, 2014, version 1.2. Printed Jun. 23, 2014. 315 pages. http://www.walkermobile.com/Touch_Technologies_Tutorial_Latest_Version.pdf.
Davis, Trevor "Reducing Capacitive Touchscreen Cost in Mobile Phones" Embedded, Feb. 25, 2013. Printed Mar. 14, 2014. Five(5) printed pages. http://staging.embedded.com/design/system-integration/4407698/Reducing-capacitive-touchscreen-cost-in-mobile-phones-.
Hong, Sukjoon "Selective Laser Direct Patterning of Silver Nanowire Percolation Network Transparent Conductor or Capacitive Touch Panel" J. Nanosci. Nanotechnol. 15, 2317-2323 (2015).

* cited by examiner

SYSTEMS AND HIGH THROUGHPUT METHODS FOR TOUCH SENSORS

BACKGROUND

Technical Field

This disclosure generally relates to an electronic system comprising a touch sensor and a method for manufacturing such system. This disclosure also generally relates to an electronic system comprising a transparent conductive electrode. This disclosure also generally relates to an optoelectronic system including a touch screen.

Description of Related Art

Since touch screens provide an easy interface for human-machine interactions, they recently have found wide range of applications in consumer electronics, such as mobile phones, tablets, global positioning systems (GPS), medical devices, laptops, point-of-sale terminals, point-of-information kiosks, industrial control units, and visual display systems.

Among many types of the touch screens, capacitive touch screens are getting more popular as compared to resistive touch screens due to their higher sensitivity to finger touch and good visibility for displays. The capacitive touch screens also allow users to perform functions not possible with resistive touch screens such as changing the orientation of images with thumb and forefinger since they can support multi-touch capability. For a summary of touch screen technologies and their features, for example, see publications by: Alfred Poor "How It Works: The Technology of Touch Screens" Computerworld, Oct. 17, 2012; Geoff Walker "Fundamentals of Touch Technologies" 2013 SID Touch Gesture Motion Conference, October 2013; and Trevor Davis "Reducing Capacitive Touchscreen Cost in Mobile Phones" Embedded, Feb. 25, 2013. The entire contents of these publications are incorporated herein by reference.

A capacitive touch screen system typically comprises a cover glass (or lens) with a screen printed decorative frame, and a touch sensor made from indium tin oxide (ITO) film deposited on another glass substrate. These two components are separately manufactured and assembled to form a single component by using an optically clear adhesive (OCA). Manufacturing of the currently available capacitive touch sensor involves in several process steps, including deposition of an ITO film on a glass surface by sputtering, then baking the ITO film above its melting point to create a conductive ITO layer, and finally etching the conductive ITO layer by photo or laser lithography to form a sensing circuit. Every manufacturing step adds to the cost of the final device, due to materials used and elongated manufacturing time. Since every step may have risks for causing defects, losses or decreasing production yield further contribute to the overall cost. In addition, as the size of the capacitive touch screen increases, so does its weight since the typical touch screen comprises two layers of glass. To achieve required touch sensitivity of large size touch sensor, sheet resistance of the transparent conducting electrode may need to be, for example, lower than 50 ohm/square. For ITO coatings on a glass substrate, such a low sheet resistance may be achieved by increasing thickness of the conductive layer while compromising transparency of the device.

Although use of ITO as an electrically conductive material dominates the manufacturing of the touch screens, the search for new materials that can replace ITO has been significantly intensified in the past few years, motivated by scarce supply of raw materials used in preparation of ITO films and ever increasing demand of consumer electronics product. Particularly, ITO based transparent conducting film may not meet the requirement of new products where light weight and great readability is essential.

Among several different approaches for manufacturing of alternative transparent conducting electrodes, nanomaterial based transparent conducting electrodes including carbon nanotubes, graphene, and especially metal nanowires are investigated as leading candidates. However, a number of challenges still exist before such an approach can meet full manufacturing specifications including optical/electrical properties and mechanical and environment stability. Especially lack of an efficient manufacturing process with high throughput capacity is one important hurdle.

Nanomaterials, especially metal nanowires may form a conductive network film by random organization of individual nanowires. Sheet resistance, or electric conductivity of the film, is largely limited by the contact among individual wires. In addition, adhesion of nanowire films to the transparent substrate may be weak due to weak molecular interaction between the metal wires and the transparent substrate, such as glass and polymer substrate. Efforts to improve adhesion without sacrificing the conductivity are reported in literature without much success. For example, in one approach, a binder material, vinyl chloride is added to a formulation conductive nanomaterial, carbon nanotube, as disclosed in Glatkowski et al. "Articles with Dispersed Conductive Coatings" U.S. Patent Application Publication No. 200610257638A1. The entire content of this disclosure is incorporated herein by reference.

Since most of the binder materials are insulators, they increase the contact resistance between nanowires or nanotubes. In another approach, as disclosed in Alden et al. "Transparent Conductors Comprising Metal Nanowires" U.S. Pat. No. 8,049,333; and "Nanowire Based Transparent Nano-Conductors" U.S. Patent Application Publication No. 200810286447A1, silver nanowires were deposited on a substrate to form a nanowire network, and then coated with a polymer matrix comprising acrylate and carboxy alkyl cellulose ether polymers. The entire contents of these disclosures are incorporated herein by reference. Although such approaches might partially solve the adhesion problem, the surface conductivity of nanowire film would be lost.

The second major challenge is the stability of the nanowire films, particularly that of films comprising silver nanowires. When exposed to the ambient atmosphere, pollutants in air, such as $H_2S$, may react with silver nanowires to form electrically non-conductive silver sulfide. Oxidation of silver by oxygen to form silver oxide would contribute another factor for instability of the touch sensors. An antioxidant is also incorporated into the overcoat formulation to prevent direct contact of the silver nanowire film with atmospheric pollutants. Such overcoats might slow down the penetration of the pollutants to the silver nanowire film. The effectiveness of protection depends on the porosity of the overcoat and its thickness. However, as the thickness of the overcoat increase, the surface conductivity of the nanowire would also be lost.

The third major challenge is related to the application of nanowire film. Continuous conductive electrode may need to be processed into a patterned sensor by widely used method such as photolithography or laser ablation. Effective photo lithography methods to etch both overcoat polymer and silver nanowire to form a touch sensor is disclosed in Allemand et al. "Nanowire-Based Transparent Conductors and Applications Thereof" U.S. Patent Application Publication No. 2014/0338735. The entire content of this disclosure is incorporated herein by reference. Feasibility of the laser ablation of the silver nanowire has been demonstrated, for example, see Hong Sukjoon et. al, Journal of Nanoscience and Nanotechnology, volume 15, no. 3, pages 2317-2323. The entire content of this publication is incorporated herein by reference. However, because the overcoat layer is transparent, it may not be ablated by the laser to allow evaporation and thereby removal of silver from the coating. Therefore most of the silver vapor formed by laser ablation may be trapped underneath the overcoat, leading to crosstalk of the patterned lines and device failure.

To reduce the cost and the weight of the touch screen, several different touch screen structures are being developed, such as sensor on-cell type touch screens, sensor in-cell type touch screens, glass lens/film sensor type touch screens, and sensor on glass lens or one glass solution (OGS) type touch screens. In these structures, main target is to reduce number of layers of glass incorporated into the system, thereby reducing the touch screen weight and costs.

However, there are still significant technical barriers for in-cell and on-cell type touch screens. For the on-cell type touch screens, the primary issue is the noise injected from the display module, such as liquid crystal display (LCD). As the touch sensor is structured to be closer and closer to the thin film transistor (TFT) switching elements of LCD, this noise substantially grows. In the case of in-cell type touch screen, the touch sensor is implemented within the TFT structure, which is complicated to manufacture, and therefore this type of touch screen is only used for a few high end applications today.

The glass lens/film type touch sensors are also manufactured by using two separate processes to prepare cover lenses and film sensors, and assembling these two components by using an optically clear adhesive. Achieving required sheet resistance with polymer film substrates is more difficult since the polymer films usually have lower thermal stability than the glass substrates. And the ITO coating layer need to be annealed at a high temperature to achieve lower sheet resistance. Most widely available ITO coatings on PET films have the sheet resistance of 150 ohm/square at acceptable transparency of higher than 85% at 550 nm. Such a high sheet resistance and a low transparency may only find applications in small size touch sensors. ITO coatings on PET films with sheet resistances lower than 50 ohm/square are rarely available and expensive.

The sensor on glass lens or one glass solution (OGS) approach may reduce the weight in overall device. This approach consolidates multilayer touch sensor system into a simpler structure and keeps supply chains intact for consumer electronics manufacturers. However, it still faces a number of technical challenges.

To be used as a glass lens, regular glass must be strengthened to prevent the breakage during the device use. The glass lens usually includes a silk screen printed decorative frame on its inner surface. This frame is used to hide the circuitry of the device. These two features of glass lens pose processing difficulties during the process scale up for commercialization. If the process scale up involves sputtering of an ITO layer on a large strengthened glass followed by patterning of the ITO layer, there may be substantial losses during cutting of the large strengthened glasses into small devices, decreasing the process yield. If the process involves small pieces of the strengthened glass, the productivity may dramatically drop.

Furthermore, the silk screen printed decorative frame usually has about 5 micrometers to 10 micrometers thickness. This frame prevents the ITO layer to form a uniform and continuous film during the ITO sputtering process across the glass and over the silk screen printed area. Any disruption in the conductive layer, at the frame to the glass transition regions, would cause device failures. This process may therefore be unsatisfactory.

SUMMARY

This disclosure generally relates to an electronic system comprising a touch sensor and a method for manufacturing such system. This disclosure also generally relates to an electronic system comprising a transparent conductive electrode. This disclosure also generally relates to an optoelectronic system including a touch screen.

The electronic system may comprise a conductive nano-composite layer, a lamination layer, and a transparent substrate. The conductive nano-composite layer, the lamination layer, and the transparent substrate each have a front surface and a back surface. The lamination layer may be formed on the front surface of the transparent substrate. The conductive nano-composite layer may be formed on the front surface of the lamination layer. In this system, the lamination layer may be positioned between the conductive nano-composite layer and the transparent substrate.

The conductive nano-composite layer may comprise a polymer. The lamination layer may comprise a polymer. The polymer may comprise polyacrylate, polymethacrylate, polyurethaneacrylate, polyisocyanurate acrylate, polyepoxide, or any combination thereof. In one example, both the conductive nano-composite layer and the lamination layer may comprise the same polymer. Both the conductive nano-composite layer and the lamination layer comprise polyacrylate, polymethacrylate, polyurethaneacrylate, polyisocyanurate acrylate, polyepoxide, or any combination thereof.

The conductive nano-material layer may comprise a nanomaterial. The nanomaterial may comprise a nanowire, a nanoribbon, a nanotube, a nanoparticle, or any combination thereof. The nanomaterial may also comprise a metal nanowire, a carbon nanotube, a graphene nanoribbon, or any combination thereof. The metal nanowire may comprise a silver nanowire, a copper nanowire, a gold nanowire, a stainless steel nanowire, or any combination thereof.

The transparent substrate may comprise poly(ethylene terephthalate) (PET), poly(methyl methacrylate) (PMMA), polycarbonate (PC), poly(ethylene naphthalate) (PEN), cellulose triacetate (TAO), polyimide (PI), or any combination thereof.

The system may also comprise a protective film. The protective film may be formed on the front surface of the conductive nano-composite layer. In this system, the conductive nano-composite layer may be positioned between the protective film and the lamination layer.

The system may also comprise a hard coat formed on the back surface of the transparent substrate. The hard coat may have a front surface and a back surface. In this system, the transparent substrate may be positioned between the lamination layer and the hard coat.

The system may also comprise a functional coating formed on the back surface of the hard coat. In this system, the hard coat may be positioned between the transparent substrate and the functional coating. The functional coating may comprise an antireflective layer, an antiglare layer, or any combination thereof.

The conductive nano-composite layer, the lamination layer, and the transparent substrate may form a component. Optical transparency of said component may be higher than 85% at about 550 nm. In another example, optical transparency of said component may be higher than 88% at about 550 nm. Sheet resistance of said component may be lower than 45 ohms per square.

The conductive nano-composite layer, the lamination layer, the transparent substrate, and the hard coat may form another component. Optical transparency of said component may be higher than 85% at about 550 nm. In another example, optical transparency of said component may be higher than 88% at about 550 nm. Sheet resistance of said component may be lower than 45 ohms per square.

The conductive nano-composite layer, the lamination layer, and the transparent substrate may form a component. Sheet resistance of said component may be lower than 70 ohms per square after said component is heated at a relative humidity of about 90% and at a temperature of about 60 degrees in centigrade for about 240 hours, or heated at a temperature of about 80 degrees in centigrade for about 240 hours.

The conductive nano-composite layer may be patterned such that the system can detect a touch. The conductive nano-composite layer may be patterned by removal of a material from the conductive nano-composite layer such that the system can detect a touch. The conductive nano-material layer may comprise a nanomaterial, and may be patterned by removal of the nanomaterial from the conductive nano-composite layer with a predetermined amount such that the system can detect a touch. The nanomaterial may comprise a silver nanowire. The patterning of the conductive nano-composite layer may form a touch sensor.

The system may be a display system comprising the touch sensor. The display system may be a liquid crystal display, a light emitting display, a light emitting organic display, a plasma display, an electrochromic display, an electrophoretic display, an electrowetting display, an electrofluidic display, or an combination thereof.

The system may also comprise an encapsulation layer formed on the front surface of the conductive nano-composite layer. The conductive nano-composite layer may be positioned between the encapsulation layer and the lamination layer.

The system may also comprise an area formed on the front surface of the conductive nano-composite layer that has a configuration to allow bonding of an integrated circuit with the conductive nano-composite layer.

The encapsulation layer may comprise a polymer. The lamination layer may comprise a polymer. The polymer may comprise polyacrylate, polymethacrylate, polyurethaneacrylate, polyisocyanurate acrylate, polyepoxide, or any combination thereof. In one example, both the encapsulation layer and the lamination layer may comprise the same polymer. The same polymer may comprise polyacrylate, polymethacrylate, polyurethaneacrylate, polyisocyanurate acrylate, polyepoxide, or any combination thereof. In another example, the encapsulation layer, the lamination layer, the conductive nano-composite layer may comprise the same polymer. The same polymer may comprise polyacrylate, polymethacrylate, polyurethaneacrylate, polyisocyanurate acrylate, polyepoxide, or any combination thereof.

A process for making the electronic system may comprise providing a first component by a process comprising forming an electrically conductive nano-composite layer on a first protective film, providing a transparent substrate, and providing a liquid lamination layer between the first component and the transparent substrate. The process may further comprise bringing the liquid lamination layer in contact with the first component and the transparent substrate, and curing the liquid lamination layer. A transparent conductive electrode may thereby be prepared.

The lamination liquid layer may comprise monomers that have one or more UV curable functional groups. The monomers may be acrylates, methacrylates, acrylic acids, methacrylic acids, urethane acrylates, acrylamides, methacrylamides, styrenes, methyl styrenes, isocyanurate acrylates, polyester acrylates, polyurethane acrylates, polyimide acrylates, epoxides, or a mixture thereof. The lamination liquid layer may further comprise a catalyst suitable for a UV curing of the monomer and an antioxidant.

The process may further comprise forming a hard coat on the transparent substrate before bringing the liquid lamination layer in contact with the first component and the transparent substrate. The process may also further comprise forming a functional coating on the hard coat.

The process of providing the first component may further comprise forming the liquid lamination layer on the conductive nanomaterial layer.

The process may further comprise bringing the liquid lamination layer in contact with the transparent substrate before bringing the liquid lamination layer in contact with the first component.

The electrically conductive layer may comprise a nanomaterial. And the process may further comprise partially removing the nanomaterial with a predetermined amount from the electrically conductive nano-composite layer in such a manner that the system can detect a touch. The nanomaterial may be removed by using a laser lithography process. A touch sensor may thereby be formed.

The process may further comprise providing a second component by a process comprising forming a primer layer on a second protective film. The formed primer layer may partially cover surface of the protective film. The process may further comprise providing a liquid encapsulation layer, bringing the liquid encapsulation layer in contact with the second component and the touch sensor, curing the liquid encapsulation layer, and peeling off the protective film. An encapsulated touch sensor may thereby be prepared.

The lamination liquid layer and the liquid encapsulation layer may comprise monomers that have one or more UV curable functional groups. The monomers may be acrylates, methacrylates, acrylic acids, methacrylic acids, urethane acrylates, acrylamides, methacrylamides, styrenes, methyl styrenes, isocyanurate acrylates, polyester acrylates, polyurethane acrylates, polyimide acrylates, epoxides, or a mixture thereof. The lamination liquid layer and the liquid encapsulation layer may further comprise a catalyst suitable for a UV curing of the monomer and an antioxidant.

Any combination of above features, systems, devices, and methods are within the scope of this disclosure.

These, as well as other components, steps, features, objects, benefits, and advantages will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

The following reference numerals are used in FIGS. 1-11 and 13-15: touch sensor 101, transparent conductive electrode 102, encapsulated touch sensor 103, sensor layer 104, lamination layer 105, transparent substrate 106, conductive nano-composite layer 107, hard coat 108, functional coating 109, protective film 110, encapsulation layer 111, bonding area 112, conductive nanomaterial layer 113, liquid lamination layer 114, lamination liquid and conductive nanomaterial mixing layer 115, "component 1" 116, liquid encapsulation layer 117, primer layer 118, "component 2" 119, "component 3" 120, "component 4" 121, "component 5" 122, "component 6" 123, and "component 7" 124.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

In this disclosure, the word "form" may mean "deposit", "coat", "dispose", "laminate", "apply", "place", "provide", "position", or the like. The phrase "any combination thereof" may mean "a mixture thereof", "a composite thereof", "an alloy thereof", or the like. In this disclosure, the indefinite article "a" and phrases "one or more" and "at least one" are synonymous and mean "at least one".

The present disclosure relates to a U.S. patent application to Hailiang Wang, entitled "Systems and Methods for Touch Sensors on Polymer Lenses", U.S. patent application Ser. No. 14/224,838; filed Mar. 25, 2014. The entire content of this patent application is incorporated herein by reference.

This disclosure generally relates to an electronic system comprising a touch sensor and a method for manufacturing such system. This disclosure also generally relates to an electronic system comprising a transparent conductive electrode. This disclosure also generally relates to an optoelectronic system including a touch screen.

This disclosure provides touch sensors and transparent conductive electrodes with high optical transmittance and low electrical resistance. This disclosure further provides high throughput manufacturing methods for such touch sensors and electrodes. Better touch sensors and electrodes with improved optical and electrical properties at a lower price may thereby be obtained.

The present disclosure also generally relates to optoelectronic systems including touch screens and displays, particularly to systems such as liquid-crystal displays (LCD), light emitting displays (LED), organic light emitting displays (OLED), polymer light emitting displays (PLED), plasma displays, electrochromic displays, and the like, which may comprise the touch sensors or the transparent conductive electrodes. The electronic system of current disclosure also relates to electrophoretic displays, electrowetting displays, electrofluidic displays and other bistable displays such as those incorporated into e-paper, Kindle readers, and the like, which may comprise the touch sensors or the transparent conductive electrodes.

Figure 1:
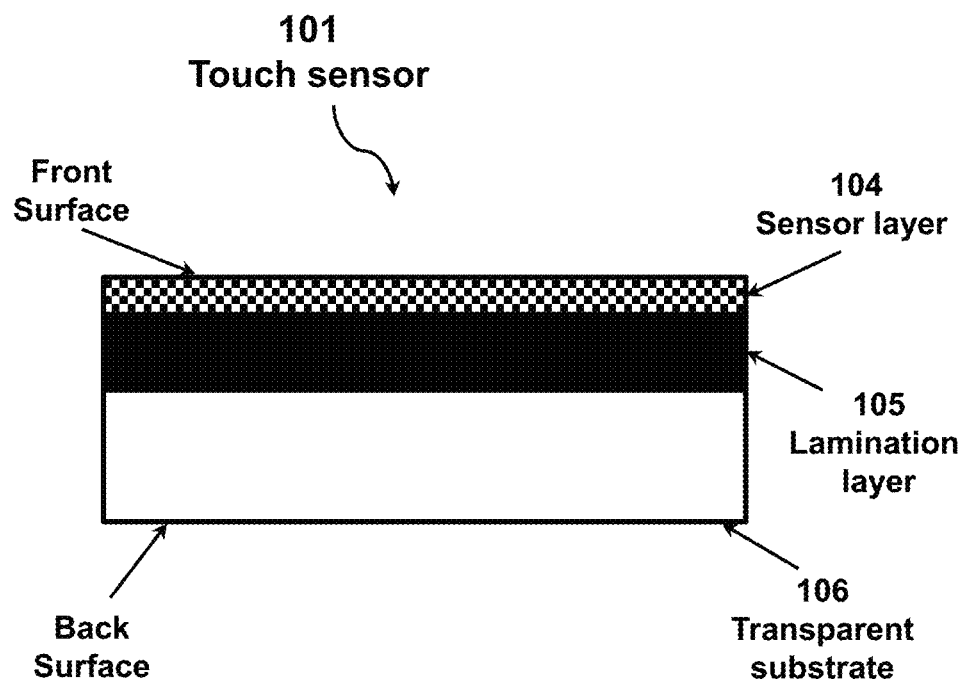
FIG. 1 is a drawing of an exemplary system comprising a touch sensor comprising a sensor layer, a lamination layer, and a transparent substrate. Features shown in this cross-sectional view of the system are not drawn to scale.

The present disclosure generally relates to an electronic system comprising a touch sensor. An example of such touch sensor is shown in FIG. 1. The touch sensor may comprise a sensor layer, a lamination layer, and a transparent substrate. Each layer of the touch sensor may have a back surface and a front surface. That is, the sensor layer, the lamination layer, and the transparent substrate each may have a back surface and a front surface. The lamination layer may be formed on the front surface of the transparent substrate. The sensor layer may be formed on the front surface of the lamination layer. The lamination layer is positioned between the sensor layer and the transparent substrate.

Figure 2:
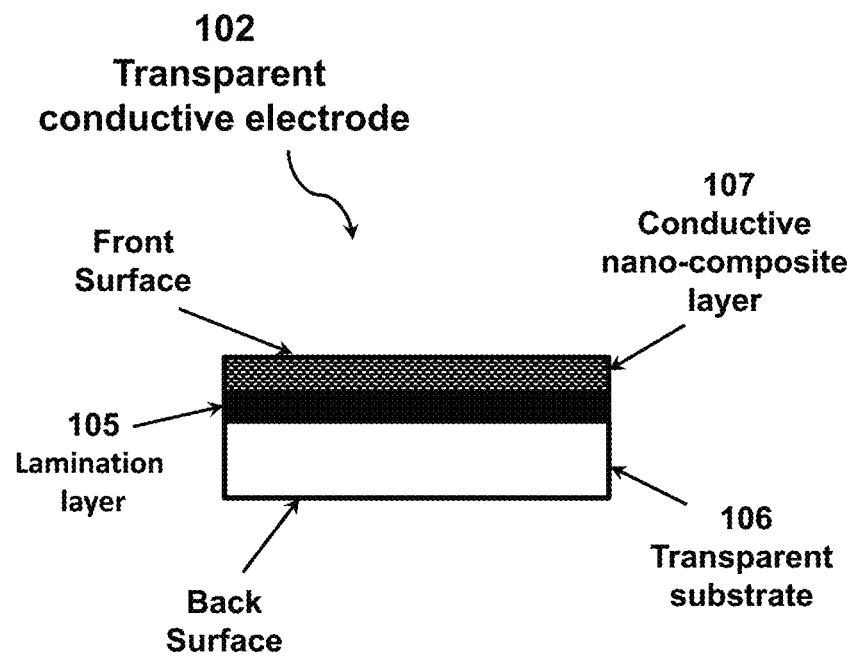
FIG. 2 is a drawing of an exemplary system comprising a transparent conductive electrode comprising a conductive nano-composite layer, a lamination layer, and a transparent substrate. Features shown in this cross-sectional view of the system are not drawn to scale.

The present disclosure also generally relates to an electronic system comprising a transparent conductive electrode. An example of such transparent conductive electrode is shown in FIG. 2. The transparent conductive electrode may comprise a conductive nano-composite layer, a lamination layer, and a transparent substrate. Each layer of the transparent conductive electrode may have a back surface and a front surface. That is, the conductive nano-composite layer, the lamination layer, and the transparent substrate each may have a back surface and a front surface. The lamination layer may be formed on the front surface of the transparent substrate. The conductive nano-composite layer may be formed on the front surface of the lamination layer. The lamination layer is positioned between the conductive nano-composite layer and the transparent substrate.

The transparent conducting electrode may be used in manufacturing of wide range of electronic devices, especially consumer electronics such as mobile phones, tablet computers, and laptops.

The sensor layer may be formed by patterning the conductive nano-composite layer such that the electronic system can detect a touch. The sensor layer may also be formed without patterning the conductive nano-composite layer. Thus, the touch sensor of this disclosure may comprise the conductive nano-composite layer or the patterned conductive nano-composite layer. Both systems are within the scope of this disclosure.

In general, the touch sensor may recognize the touch and position of the touch on a surface of the electronic system ("touch-sensitive surface"). Examples of such touches may include touching of fingers or other objects upon the touch-sensitive surface. The electronic system may include an array of such touch sensors capable of detecting touches. These systems may be able to detect multiple touches (e.g. the touching of fingers or other objects upon the touch-sensitive surface at distinct locations at about the same time) and near touches (e.g. fingers or other objects close to the touch-sensitive surface), and identify and track their locations.

The touch sensor or the transparent conductive electrode may have any shape. They may be flat or curved. For example, they may have concave shapes, convex shapes, flat shapes, or a combination of these shapes.

The conductive nano-composite layer may comprise a nanomaterial. The nanomaterial may comprise an electrically conductive nanomaterial. Examples of the electrically conductive nanomaterial may be a nanowire, a nanoribbon, a nanotube, a nanoparticle, and any combinations thereof. Examples of such materials may be silver, gold, platinum, copper, aluminum, nickel, stainless steel, carbon, and any combinations thereof. Examples of carbon may be single wall or multiwall carbon nanotube, graphene, and any combinations thereof. Other examples of such electrically conductive materials may be electrically conductive polymers such as polypyrrole, polyaniline, polythiophene, poly (3-methylthiophene), poly(3,4-ethylenedioxythiophene), and any combinations thereof. Further examples of such electrically conductive materials may be electrically conductive ceramics such as indium tin oxide (ITO). Any combinations of these electrically conductive materials may be used in manufacturing of the system comprising the touch sensor or the transparent conductive electrode. Thus, examples of a nanomaterial may be a silver nanowire, a gold nanowire, a copper nanowire, an ITO nanowire, a single wall carbon nanotube (SWCN), a multi-wall carbon nanotube (MWCN), a graphene nanoribbon, a carbon fiber, a conducting polymer, and any mixtures thereof. The smallest dimension of the at least one nanomaterial may vary in the range of 10 nanometers (nm) to 1,000 nm. The smallest dimension of the at least one nanomaterial may also vary in the range of 10 nm to 200 nm.

The conductive nano-composite layer may further comprise a polymer ("nano-composite layer polymer"). The nano-composite layer polymer may be any polymer suitable for manufacturing of the touch sensor or the transparent conductive electrode. The nano-composite layer polymer may not be an electrically conductive polymer. Examples of such polymer are polyacrylate, polymethacrylate, polyacrylic acid, polymethacrylic acid, polyacrylamide, polymethacrylamide, polystyrene, polymethyl styrene, polyester acrylate, polyurethane acrylate, polyisocyanurate acrylate, polyimide acrylate, polyepoxide, and any combination thereof.

The nano-composite layer polymer may provide structural strength, adhesive strength, and/or protection to the touch sensor or the transparent conductive electrode. For example, the nano-composite layer polymer may form a composite with the nanomaterial that provides protection for the nanomaterial that may be mechanically weak. This composite may be in the form of a sheet or a layer that may have sufficient mechanical strength to withstand handling during the manufacturing and/or use of the electronic system. In another example, this nano-composite layer polymer may provide sufficient adhesive strength for adhesion of the conductive nano-composite layer with the lamination layer. In one example, the sensor layer or the conductive nano-composite layer may be formed by a laminating process in which the at least one nanomaterial layer (mesh) is mixed with a coating comprising monomers, oligomers, polymers, or combinations thereof. The monomers or oligomers may form the conductive nano-composite layer through polymerization of these monomers, oligomers, for example, using UV or thermal curing processes.

Thickness of the sensor layer or the conductive nano-composite layer may vary in the range of 5 nanometers to 1000 nanometers, or in the range of 30 nanometers to 100 nanometers.

The lamination layer may comprise any polymer ("lamination layer polymer"). The lamination layer polymer may not comprise an electrically conductive polymer. Examples of the lamination layer polymer may be polyacrylate, polymethacrylate, polyacrylic acids, polymethacrylic acids, polyacrylamide, polymethacrylamide, polystyrene, polymethyl styrene, polyester acrylate, polyurethane acrylate, polyisocyanurate acrylate, polyimide acrylate, polyepoxides, and any combination thereof. The lamination layer may have any shape. It may be flat or curved. For example, it may have a concave shape, a convex shape, a flat shape, or a combination of these shapes. Thickness of lamination layer may vary in the range of 1 nanometer to 50 micrometers, or in the range of 10 nanometers to 10 micrometers.

The transparent substrate of the present disclosure may be any transparent polymer. Examples of the polymers for the transparent substrate may be poly(ethylene terephthalate) (PET), poly(methyl methacrylate) (PMMA), polycarbonate (PC), poly(ethylene naphthalate) (PEN), cellulose triacetate (TAO), polyimide (PI), and any combination thereof.

The transparent substrate may have any shape. It may be flat or curved. For example, it may have a concave shape, a convex shape, a flat shape, or a combination of these shapes. The transparent substrate may be flexible or rigid. The transparent substrate may have a light transmittance of at least 85%, at least 90%, or at least 92% at 550 nm. Thickness of the transparent substrate may vary in the range of 0.01 millimeter (mm) to 6 mm. For a flexible transparent substrate, the thickness may also vary in the range of 0.01 mm to 0.150 mm. For a rigid transparent substrate, the thickness may also vary in the range of 0.5 mm to 1 mm.

A transparent polymer substrate may provide better physical and/or chemical properties than the transparent glass substrate. For example, a polymer may have similar or higher dielectric constant than a glass. In general, polymers may be less fragile as compared to glasses. Mechanical strength of polymers may be much higher than those of glasses. For example, mechanical strength of PMMA is 17 times higher than that of the regular glass. PC may also have higher impact strength than the PMMA. Polymer substrate may have similar or higher optical transparency than a glass substrate. For example, the light transmittance of PMMA at visible light wavelengths is similar to or higher than the glass. Furthermore, the touch sensor comprising the transparent polymer substrate may be lighter in weight as compared to that comprising a glass. For example, PMMA has a density varying in the range of 1.17 $g/cm^3$ to 1.20 $g/cm^3$, which is lower than the glass density. Also, it may be easier to process, e.g. cut, shape, and/or form the polymer substrate as compared to the glass substrate, which may decrease the manufacturing cost of the system.

Figure 3:
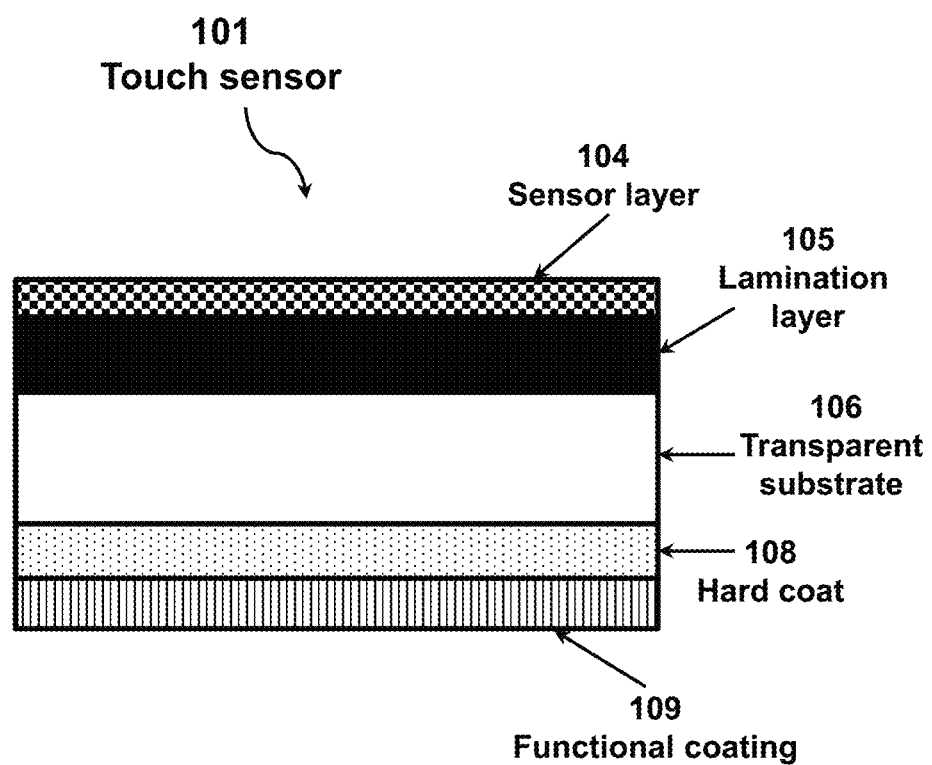
FIG. 3 is a drawing of an exemplary system comprising a touch sensor comprising a sensor layer, a lamination layer, a transparent substrate, a hard coat, and a functional coating. Features shown in this cross-sectional view of the system are not drawn to scale.
Figure 4:
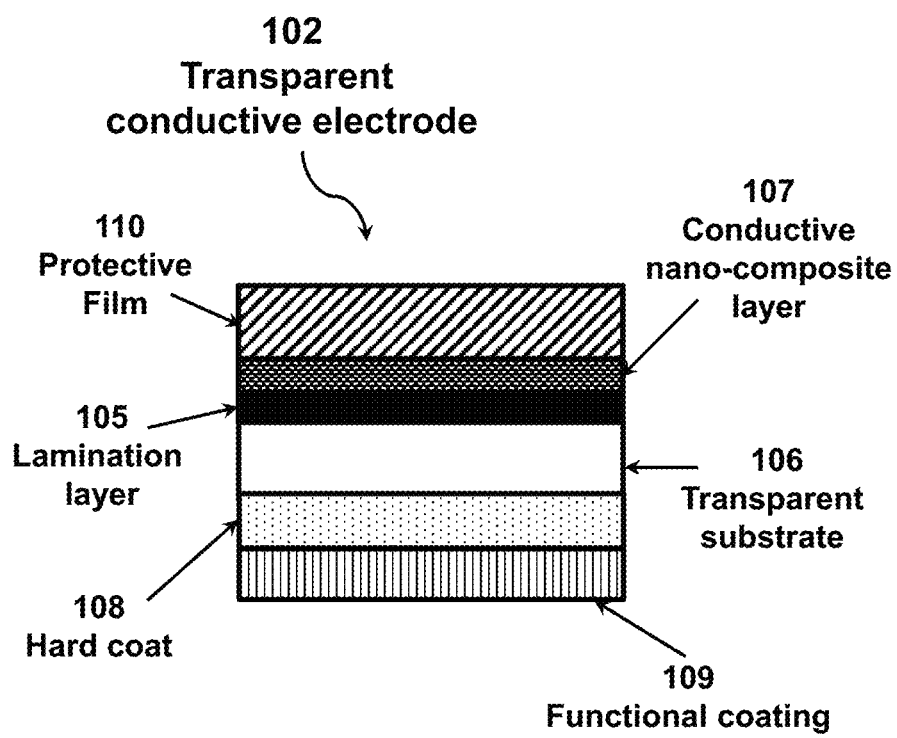
FIG. 4 is a drawing of an exemplary system comprising a transparent conductive electrode comprising a protective film, a conductive nano-composite layer, a lamination layer, a transparent substrate, a hard coat, and a functional coating. Features shown in this cross-sectional view of the system are not drawn to scale.

The electronic system may further comprise a hard coat to provide scratch-resistance and abrasion resistance properties to the transparent substrate. The hard coat may have a front surface and a back surface. Examples of such system comprising the hard coat are shown in FIGS. 3-4. The hard coat may be formed on the back surface of the transparent substrate. In this example of the electronic system, the transparent substrate is positioned between the lamination layer and the hard coat.

The hard coat may prevent or minimize formation of scratches during the fabrication of the system and its handling by end user, thereby increasing the system durability. The hard coat may be formed on the back surface of the transparent substrate. The thickness of the hard coat may vary in the range of 2 micrometers to 15 micrometers. The thickness of the hard coat may also vary in the range of 5 micrometers to 10 micrometers.

The system may further comprise a functional coating. The functional coating may have a front surface and a back surface. Examples of such system are shown in FIGS. 3-4. The functional coating may be formed on the back surface of the hard coat. In this example of the electronic system, the hard coat is positioned between the transparent substrate and the functional coating.

The functional coating may provide additional optical and/or protective properties to the electronic system. Examples of such optical coating coatings may be antireflection coatings, antiglare coatings, and combinations thereof. Examples of such protective coatings may be antistatic coatings, anti-stain coatings, hydrophobic coatings, fingerprint proof coatings, and combinations thereof. The at least one functional coating may be formed on the surface of the hard coat by any solution deposition method, such as dip coating, spray coating, Mayer rod coating, slot die coating, screen printing, and other traditional coating methods followed by any suitable curing method such as thermal curing, ultraviolet (UV) curing, infrared (IR) curing and the like.

An antireflective coating may improve transparency of the electronic system. The antireflective coating may comprise an antireflective layer. The antireflective coating may be formed on a hard coat layer or on another functional coating. Formulations and methods of deposition of multilayer antireflection coatings are known in the art. For example, see publications: U.S. Patent Application Publication No. 2014/0038109 "Antireflective Coating Composition and Process Thereof" to Rahman, D. M. et. al.; U.S. Patent Application Publication No. 2014/0009834 "Novel Antireflective Coatings with Graded Refractive Index" to Kalyankar, N. D.; U.S. Patent Application Publication No. 2013/0164545 "Compositions for Antireflective Coatings" to Evans, J. P. et al.; U.S. Patent Application Publication No. 2013/0095237 "Sol-Gel Based Antireflective Coatings Using Alkyltrialkoxysilane Binders Having Low Refractive Index and High Durability" Kalyankar, N. D. et al.; U.S. Patent Application Publication No. 2014/0051804(A1) "Polysilanesiloxane Resins for Use in an Antireflective Coating" to Xiaobing Zhou et al.; and U.S. Patent Application Publication No. 2014/0023840(A1) "Antireflection Film and Method of Producing Same" to Shibayama, N. et al. The entire contents of these publications are incorporated herein by reference.

The readability of the device may be improved by adding an antiglare coating on the surface of the hard coat. Formulation and method of applying antiglare coating on the surface of the hard coat is known in the art. For example, see publications: U.S. Patent Application Publication No. 2013/0286478 "Anti-Glare Film, Method for Producing Anti-Glare Film, Polarizer and Image Display Device" to Furui, G. et al.; U.S. Patent Application Publication No. 2013/0230733 "Resin Particles and Process for Producing Same, Antiglare Film, Light-Diffusing Resin Composition, and External Preparation" to Nakamura, M. et al.; U.S. Patent Application Publication No. 2012/0177920 "Antiglare and Antiseptic Coating Material and Touchscreen Coated with the Same" to Huang, Y. H.; U.S. Patent Application Publication No. 2012/0141736 "Antiglare Hard Coat Film" to Hotta, T. et. al.; U.S. Patent Application Publication No. 2013/0250414(A1) "Antiglare Film, Polarizer, and Image Display Device" to Eguchi, J. et al.; and U.S. Patent Application Publication No. 2013/0088779(A1) "Antireflective and Antiglare Coating Composition, Antireflective and Antiglare Film, and Method for Producing Same" to Kang, J. K. et al. The entire contents of these publications are incorporated herein by reference.

Anti-fingerprint coatings are also known as a type of functional coatings in the art. For example see publications: U.S. Patent Application Publication No. 2014/0030488 "Panel with Anti-Fingerprint Property and Manufacturing Method Thereof" to Jung, D. et al.; and U.S. Patent Application Publication No. 2013/0157008 "Anti-Fingerprint Coatings" to Aytug, T. et al. The entire contents of these publications are incorporated herein by reference.

The electronic system may further comprise a protective film. An example of this system is shown in FIG. 4. The protective film may have a front surface and a back surface. The protective film may be formed on the front surface of the conductive nano-composite layer or the sensor layer. In this system, the conductive nano-composite layer may be positioned between the protective film and the lamination layer. Or, in this system, the sensor layer may be positioned between the protective film and the lamination layer. The protective film may provide a mechanical protection to the transparent conductive electrode, thereby preventing damage to the electrode during its handling. Also, the protective film may isolate the transparent nano-conductive layer from the ambient air. Therefore environment stability of the transparent conductive electrode may greatly be enhanced.

Figure 5:
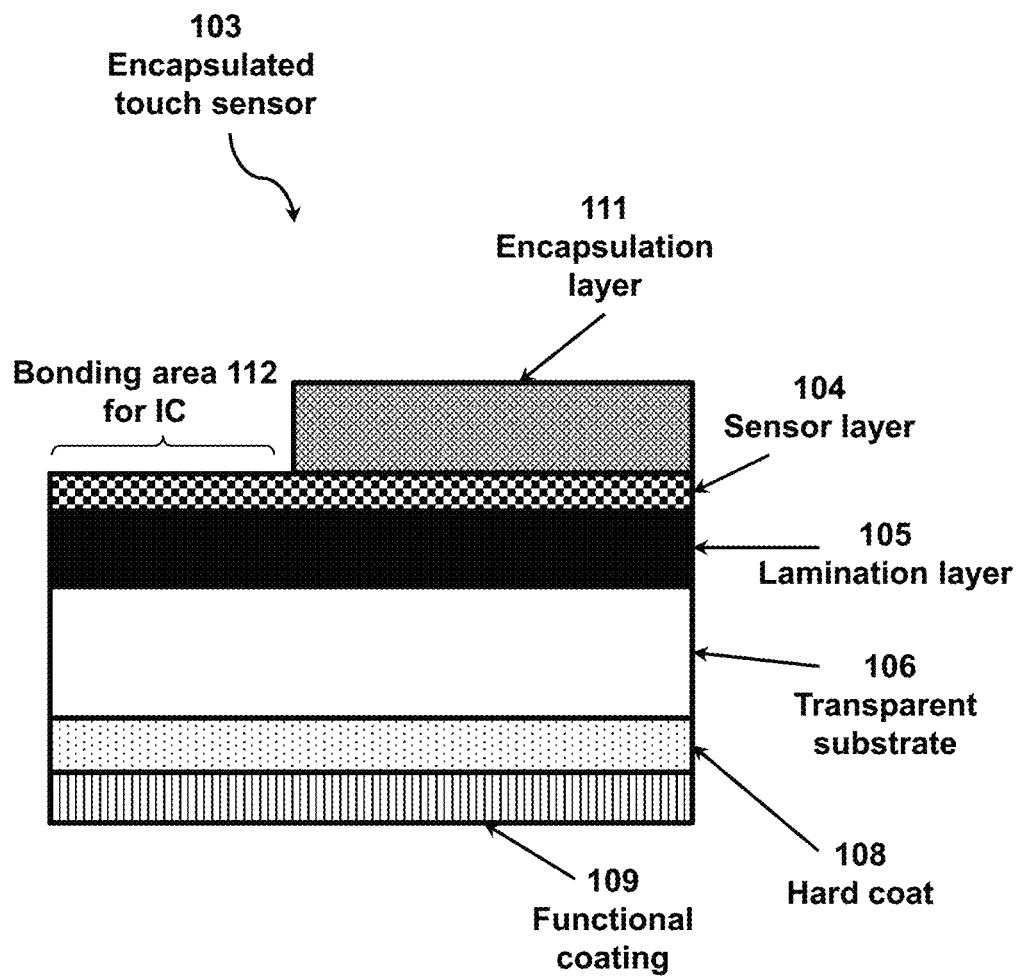
FIG. 5 is a drawing of an exemplary system comprising an encapsulation layer, a sensor layer, a lamination layer, a transparent substrate, a hard coat, and a functional coating. This exemplary system also comprises a bonding area formed on the sensor layer that allows for integration of the system to an integrated circuit (IC). This exemplary system may be used as an encapsulated touch sensor. Features shown in this cross-sectional view of the system are not drawn to scale.

The protective film may comprise any polymer ("the protective film polymer"). The protective film polymer may not be a conductive polymer. The electronic system may further comprise an encapsulation layer. An example of such a system is shown in FIG. 5. The encapsulation layer may have a front surface and a back surface. The encapsulation layer may be formed on the front surface of the conductive nano-composite layer or the sensor layer. In this system, the conductive nano-composite layer may be positioned between the encapsulation layer and the lamination layer. Or, in this system, the sensor layer may be positioned between the encapsulation layer and the lamination layer.

The encapsulation layer may comprise any polymer ("the encapsulation layer polymer"). The encapsulation layer polymer may be a transparent polymer. The encapsulation layer polymer may not be an electrically conductive polymer. Examples of the encapsulation layer polymer may be polyacrylate, polymethacrylate, polyacrylic acid, polymethacrylic acid, polyacrylamide, polymethacrylamide, polystyrene, polymethyl styrene, polyester acrylate, polyurethane acrylate, polyimide acrylate, polyisocyanurate acrylate, polyepoxides, and any combination thereof. Thickness of the encapsulation layer may vary in the range of 0.1 micrometer to 50 micrometers, or in the range of 1 micrometer to 10 micrometers.

The electronic system may further comprise an area formed on the front surface of the conductive nano-composite layer or the sensor layer ("bonding area"). An example of such system is shown in FIG. 5. The bonding area may be used to bond an integrated circuit with the conductive nano-composite layer or the sensor layer.

The touch sensor or the transparent conductive electrode may be manufactured by any suitable method. Examples of such method are disclosed below.

The disclosure is illustrated further by the following additional examples that are not to be construed as limiting the disclosure in scope to the specific procedures or products described in them.

Example 1

Preparation of a Transparent Conductive Electrode

Figure 6:
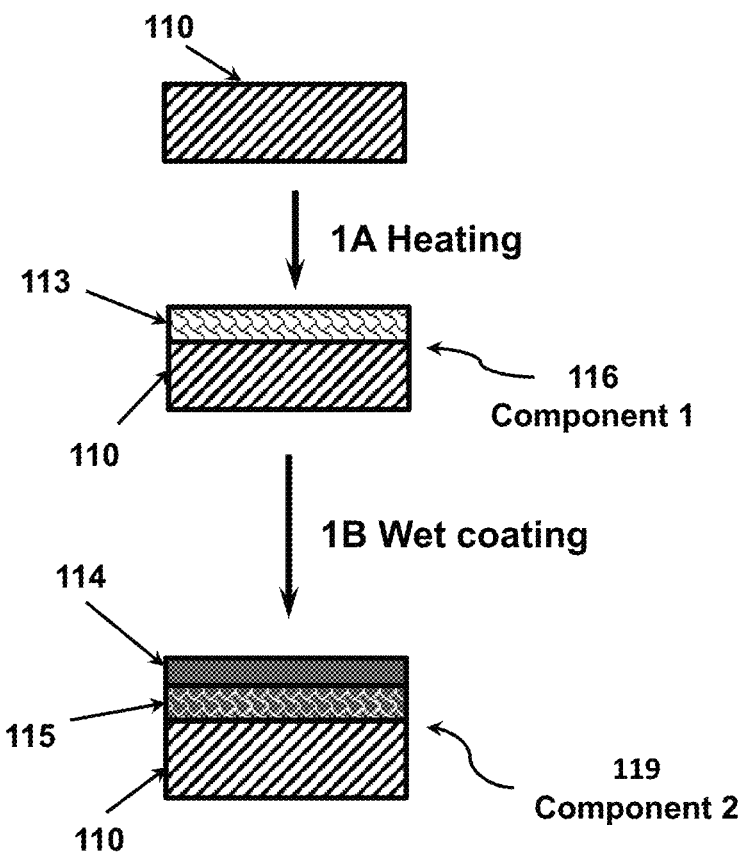
FIG. 6 is a drawing of an exemplary method of forming a component 1 and component 2. Features shown in this cross-sectional view of the system comprising the component 1 and component 2 are not drawn to scale.
Figure 7:
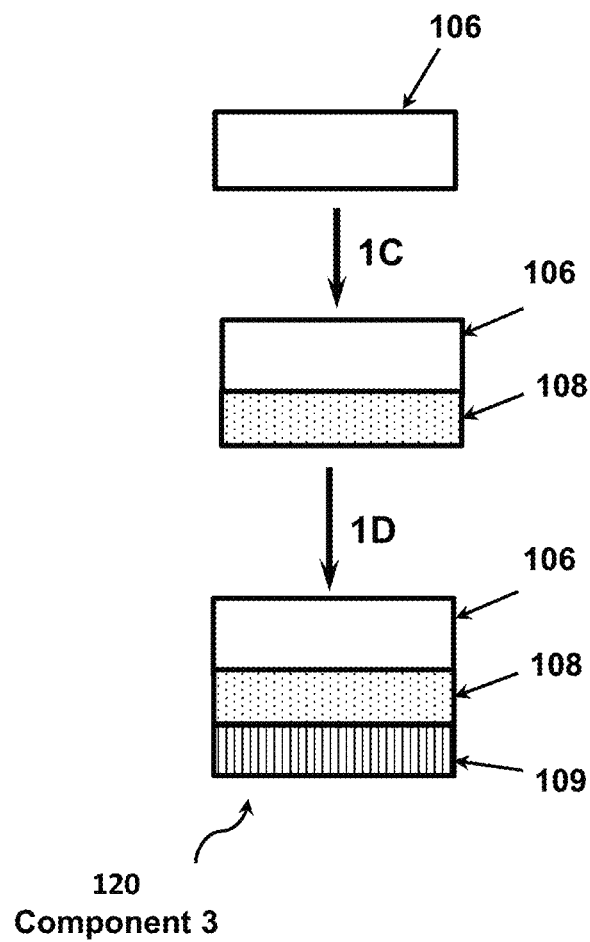
FIG. 7 is a drawing of an exemplary method of forming a component 3. Features shown in this cross-sectional view of the system comprising the component 3 are not drawn to scale.
Figure 8:
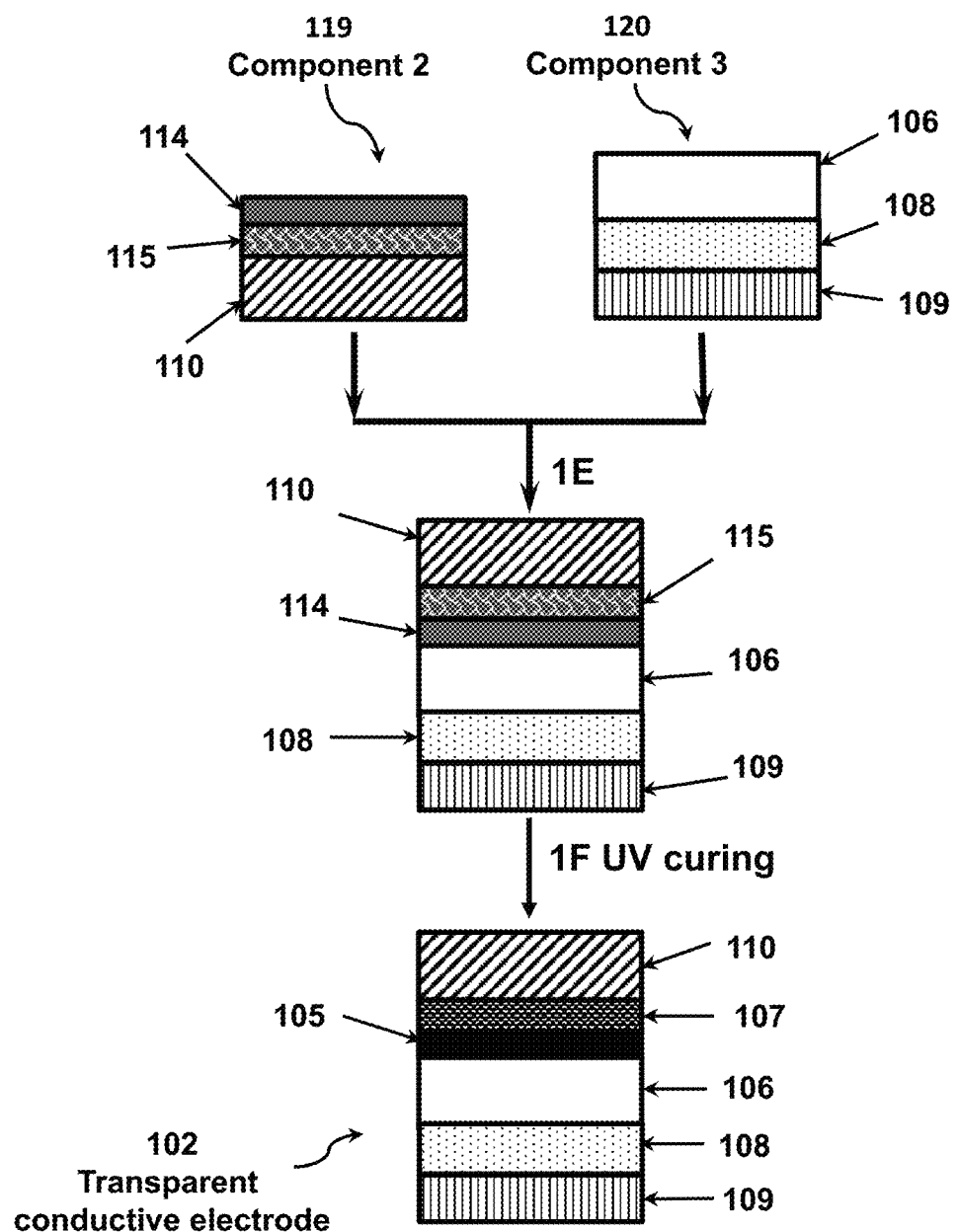
FIG. 8 is a drawing of an exemplary method of forming a system comprising an exemplary transparent conductive electrode. Features shown in this cross-sectional view of said system are not drawn to scale.

In this example, a method for preparation of a transparent conductive electrode is disclosed. This exemplary method is shown in FIGS. 6-8. The following reference numerals are used in FIGS. 6-8: transparent conductive electrode 102, lamination layer 106, transparent substrate 106, conductive nano-composite layer 107, hard coat 108, functional coating 109, protective film 110, conductive nanomaterial layer 113, liquid lamination layer 114, lamination liquid and conductive nanomaterial mixing layer 115, "component 1" 116, "component 2" 119, and "component 3" 120.

In this example, a protective film may be provided, as shown in FIG. 6. The protective film may be a film with a low coefficient of linear thermal expansion. The protective film may have a linear thermal expansion of less than 1.5% at 150 degrees centigrade, less than 0.8% at 150 degrees centigrade, or less than 0.5% at 150 degrees centigrade. The protective film may comprise any polymer ("the protective film polymer"). Examples of the protective film polymer may be poly (ethylene terephthalate) (PET), polycarbonate (PC), poly(ethylene naphthalate) (PEN), triacetylcellulose (TAC) and any combination thereof. Thickness of the protective film may vary in the range of 0.01 millimeter (mm) to 0.250 mm, or in the range of 0.01 mm to 0.150 mm.

In this example, a liquid formulation of the electrically conductive nanomaterial ("nanomaterial dispersion") may be prepared as follows. In this preparation, the electrically conductive nanomaterial is mixed with a compatible solvent. Examples of the electrically conductive nanomaterial may be a nanowire, a nanoribbon, a nanotube, a nanoparticle, and any combinations thereof. Further examples of the electrically conductive nanomaterial are disclosed above.

The solvent may be water or an organic solvent. Examples of organic solvents may be alcohols, ketones, ethers, esters, acetates, and the mixtures thereof. Examples of organic solvents may also be methanol, ethanol, isopropanol, 2-methoxyethanol, 1-methoxy-2-propanol, ethyl acetate, n-butyl acetate, t-butyl acetate, 2-propoxyethanol, propylene glycol monomethyl ether acetate, and mixtures thereof. Solid content of the electrically conductive nanomaterial (for example, a nanowire) in the formulation may vary in the range of 0.1 milligram/milliliter (mg/ml) to 10 mg/ml. The solid content of the nanomaterial in the dispersion may also vary in the range of 1 mg/ml to 5 mg/ml. A dispersant may also be added to the nanomaterial dispersion.

The nanomaterial dispersion may be deposited on a surface of the protective film by any web coating method known in the art. Examples of these deposition methods may be slot die coating method, Mayer rod coating method, gravure or reverse gravure method, micro-gravure coating method and any combination of such methods. Such coating methods may use any commercially available equipment. For example, the slot die coating method may be used for coating of nanomaterial dispersion with good precision.

After the liquid nanomaterial dispersion is deposited on the protective film, the protective film may be thermally treated to remove the solvent and thereby to form a solid conductive nanomaterial layer on the surface of the protective film, as shown in FIG. 6-1A. The thermal treatment of the liquid nanomaterial coating may be achieved by any suitable method, including regular or infrared (IR) heating in a tunnel oven. The thermal treatment temperature and time, length of the tunnel oven, and speed of the web coating may be adjusted to completely or substantially remove the solvent from the wet coating by evaporation, and anneal the conductive nanomaterial layer without deteriorating the dimensional stability of the protective film. For example, the tunnel oven temperature may be kept in the range of 100 degree centigrade to 150 degree centigrade for a PET protective film, or kept in the range of 100 degree centigrade to 200 degree centigrade for a polyimide protective film. The thermal treatment time may be less than 30 minutes, or less than 5 minutes. After the thermal treatment, a "component 1" comprising the conductive nanomaterial layer and the protective film may thereby be prepared.

Then, the component 1 may be coated with a liquid lamination layer as shown in FIG. 6-1B. A liquid lamination formulation may comprise a monomer or an oligomer, and a curing catalyst. The lamination formulation may also comprise a monofunctional monomer, a di-functional monomer, and a tri-functional monomer; and a compatible curing catalyst. For example, composition of the lamination formulation may comprise the mono-functional monomer (1% to 50%), di-functional monomer (10% to 80%), tri-functional monomer (1% to 50%), a curing catalyst (1% to 6%), a leveling agent (0.1% to 0.3%), and an antioxidant (0.1% to 0.3%) weight percentage.

Examples of monomers suitable for preparation of the lamination formulation may be acrylate, methacrylate, acrylic acid, methacrylic acid, urethane acrylate, acrylamide, methacrylamide, styrene, methyl styrene, isocyanurate acrylate polyester acrylate, polyurethane acrylate, polyimide acrylate, various epoxides, and a mixture thereof. Examples of the curing catalyst may be a free radical catalyst such as benzoin, benzoin alkyl ethers, acylphosphine oxides, 1,1-diethoxyacetophenone, 1-benzoylcyclohexanol, benzophenone, 2,2-dimethoxy-2-phenylacetophenone, 2-methyl-1-[4-(methylthio)phenyl]-2-(4-morpholinyl)-1-propanone, 1-hydroxycyclohexyl phenyl ketone, and the like; cationic UV curing catalysts such as diaryliodonium salt, dialkyl-phenacylsulfonium, ferrocenium salt, triarylsulfonium salt and the like; and mixtures of these free radical and/or cationic UV curing catalysts.

A surface of the conductive nanomaterial layer of the component 1 may be coated with the lamination formulation by using any suitable coating method. For example, such coating may be applied by using a slot die, a coma coater, a silk screen printing method, a gravure method. Equipment for such method is commercially available. A slot die or comma coater method may be used. Coating thickness of the liquid lamination layer on the surface of the component 1 may vary in the range of 30 nanometers to 30 micrometers, or in the range of 100 nanometers to 10 micrometers.

The conductive nanomaterial layer may be a porous layer. During the coating of the liquid lamination layer on the conductive nanomaterial layer of the component 1, part of the liquid lamination formulation may penetrate into the pores of the conductive nanomaterial layer, forming a layer comprising conductive nanomaterial and the liquid lamination ("lamination liquid and conductive nanomaterial mixing layer") as shown in FIG. 6-1B. A "component 2" comprising the protective film, the lamination liquid and conductive nanomaterial mixing layer, and the liquid lamination layer may thereby be prepared.

A "component 3" comprising the transparent substrate, the hard coat, and the functional coating may be prepared as follows, as shown in FIGS. 7, 1C and 1D. The component 3 may be prepared in a preparation line separate to that used in preparation of the component 2.

The hard coat may be formed on the back surface of the transparent substrate by any solution deposition method, such as dip coating, spray coating, Mayer rod coating, slot die coating, screen printing and other traditional coating methods followed by any suitable curing method such as thermal curing, UV curing, infrared (IR) curing and the like. For example, a formulation containing silica nanoparticles and UV curable monomer or oligomers comprising acrylates, methacrylates, epoxy function groups, a photo initiator, and an optional solvent may first be deposited, and then cured on the said surface by UV light. Formulations and methods of deposition of hard coats on polymer substrates are known in the art. For examples of such formulations and methods, see publications: U.S. Pat. No. 7,173,778 "Stain Repellent Optical Hard Coating" to Naiyong Jing et al.; European Patent Application Publication No. 2275841 A2 "Manufacturing Method of Hard Coat Liquid and Plastic Lens Manufacturing Method Thereof" to Kojima, H. et al.; and U.S. Pat. No. 8,247,468 B2 "Composition for Hard Coat, Article Having Hard Coat Layer and Method for Producing the Article" to Yoneyama K. et al. The entire contents of these publications are incorporated herein by reference.

The functional coating may be formed on the hard coat by any solution deposition method, such as dip coating, spray coating, Mayer rod coating, slot die coating, and screen printing process.

The component 3 comprising the transparent substrate, the hard coat, and the functional coating may thereby be prepared.

Then, the component 2 and the component 3 may be combined by a lamination process, as shown in FIG. 8-1E. The lamination process may be a film-to-film lamination process or film-to-sheet lamination process, depending on the type of the transparent substrate. During the lamination process, lamination liquid may substantially or completely fill all void volume between the transparent substrate and the protective film. Also, during the lamination process, the lamination liquid may substantially or completely fill all void volume of the pores of the conductive nanomaterial layer. Excess lamination liquid may form the liquid lamination layer. Any trapped air within and/or between the layers may be driven off by applying appropriate pressures on the component 2 and the component 3. For example, these two components may be passed through two rolls that have a precise gap between them or by applying a pressure on these two rolls.

After the lamination process, a UV curing of the combined components may yield the transparent conductive electrode comprising the protective film, the conductive nano-composite layer, the lamination layer, the transparent substrate, the hard coat, and the functional coating, as shown in FIG. 8-1F.

Example 2

Preparation of a Transparent Conductive Electrode

Figure 9:
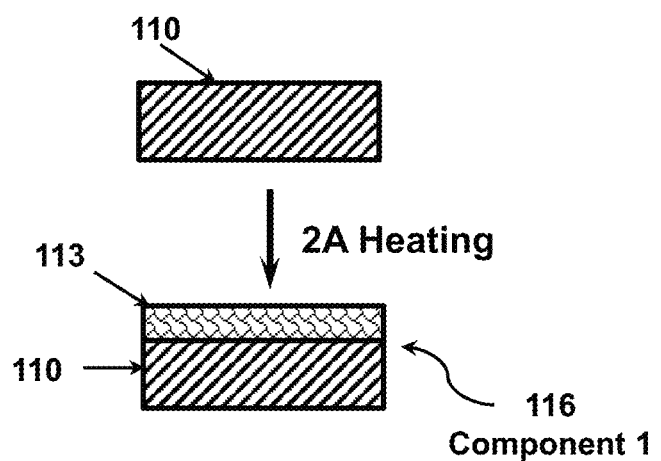
FIG. 9 is a drawing of an exemplary method of forming a component 1. Features shown in this cross-sectional view of the system comprising the component 1 and component 2 are not drawn to scale.
Figure 10:
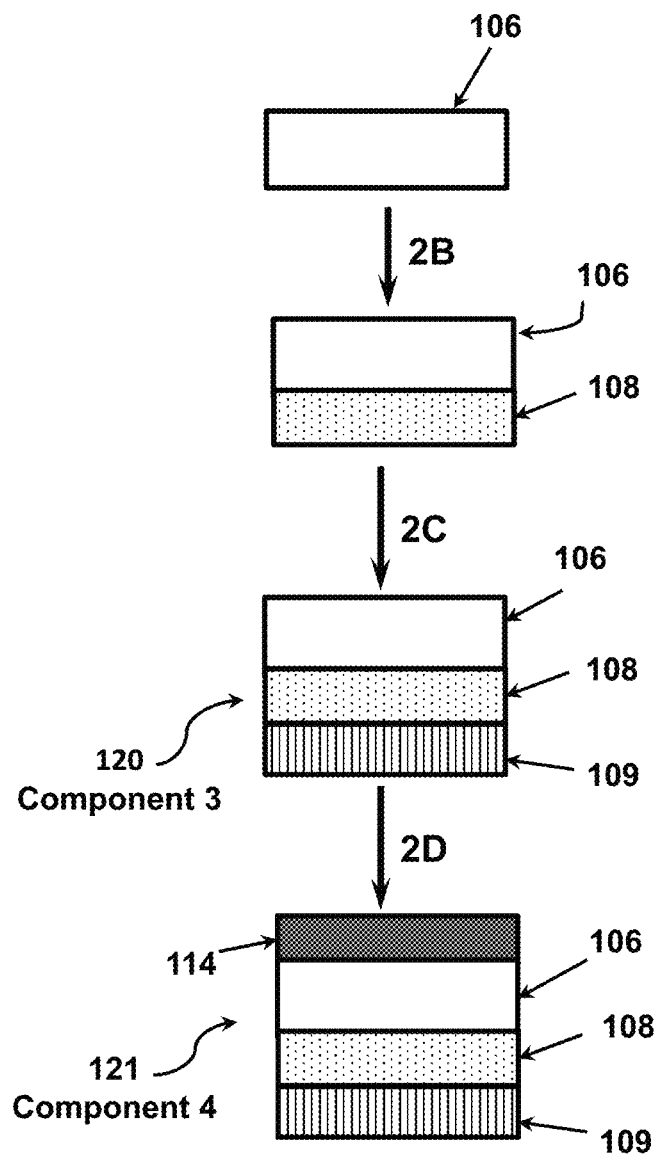
FIG. 10 is a drawing of an exemplary method of forming a component 3 and a component 4. Features shown in this cross-sectional view of the system comprising the component 3 and component 4 are not drawn to scale.
Figure 11:
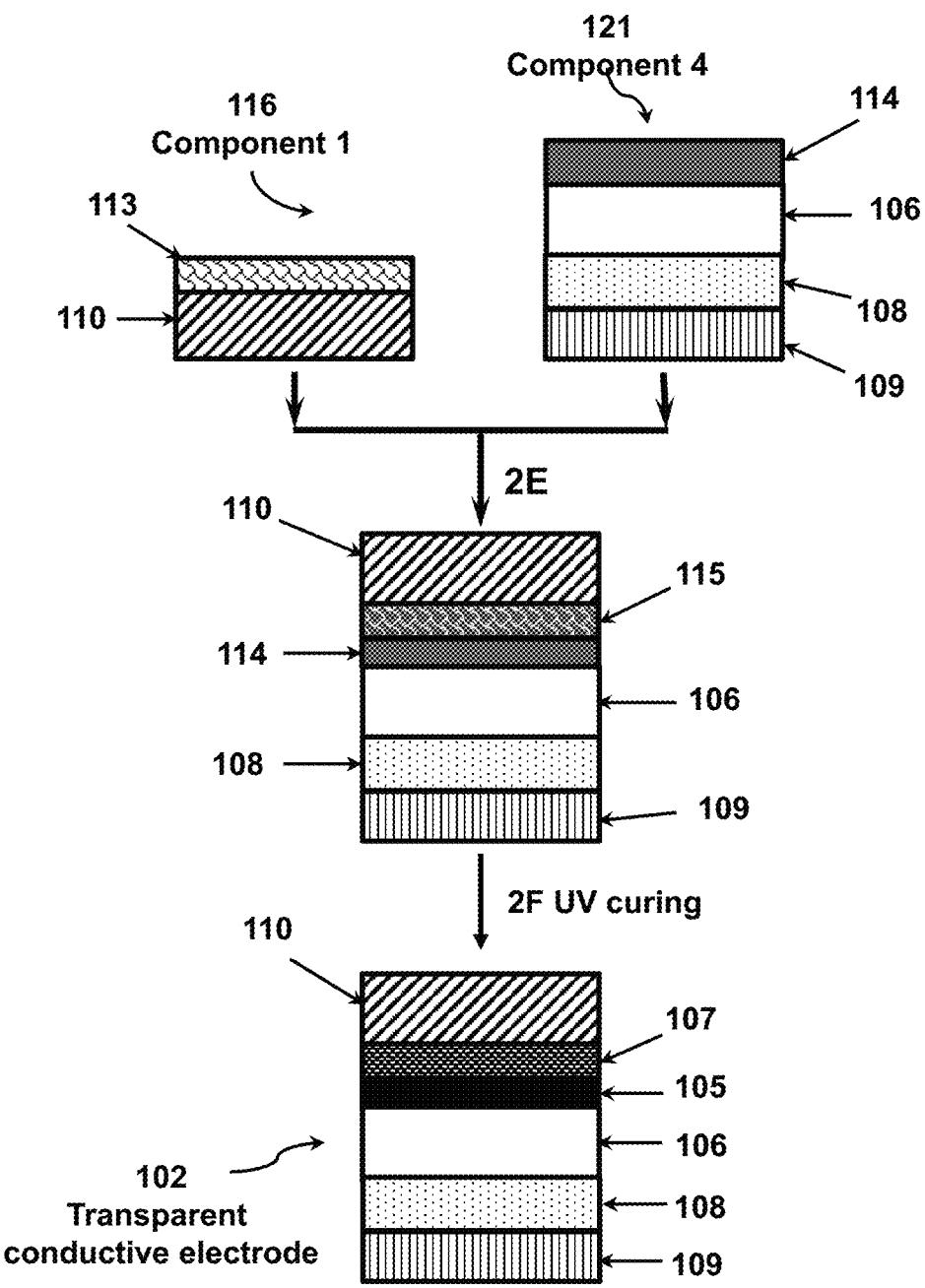
FIG. 11 is a drawing of an exemplary method of forming a system comprising an exemplary transparent conductive electrode. Features shown in this cross-sectional view of said system are not drawn to scale.

In this example, a method for preparation of a transparent conductive electrode is disclosed. This is a method alternative to that disclosed in Example 1. The formulations, the thermal and UV curing methods, and the coating methods used in this example are disclosed in Example 1 above. This exemplary method is shown in FIGS. 9-11. The following reference numerals are used in FIGS. 9-11: transparent conductive electrode 102, lamination layer 105, transparent substrate 106, conductive nano-composite layer 107, hard coat 108, functional coating 109, protective film 110, conductive nanomaterial layer 113, liquid lamination layer 114, lamination liquid and conductive nanomaterial mixing layer 115, "component 1" 116, "component 3" 120, and "component 4" 121.

In this example, the protective film is coated with the liquid nanomaterial dispersion. After the coating, the protective film may be thermally treated to remove the solvent and thereby to form a solid conductive nanomaterial layer on the surface of the protective film, as shown in FIG. 9-2A. A component 1 comprising the protective film and the conductive nano-material layer may thereby be prepared.

A "component 4" comprising the transparent substrate, the hard coat, the functional coating, and the liquid lamination layer may be prepared as follows, as shown in FIG. 10, 2B-2D. The component 4 may be prepared in a preparation line separate to that used in preparation of the component 1. The component 3 may be prepared by following the same method disclosed in Example 1 above. The liquid lamination layer may be deposited on the transparent substrate of the component 3 as shown in FIG. 2D, thereby forming the component 4.

Then the component 1 and the component 4 may be combined by the lamination process, as shown in FIG. 11-2E. After the lamination process, a UV curing of the combined components may yield the transparent conductive electrode comprising the protective film, the conductive nano-composite layer, the lamination layer, the transparent substrate, the hard coat, and the functional coating, as shown in FIG. 11-2F.

Example 3

A High Throughput Preparation of a Transparent Conductive Electrode

Figure 12:
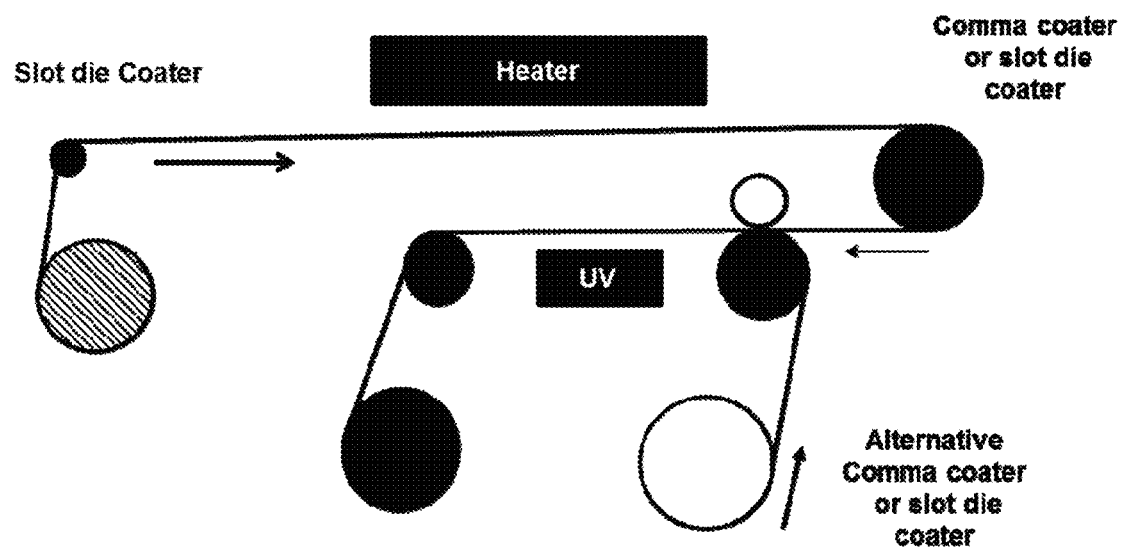
FIG. 12 is a drawing of an exemplary manufacturing system that may be used in manufacturing of the exemplary systems described in this disclosure.

In this example, a high throughput method for preparation of a transparent conductive electrode is disclosed. This exemplary method is shown in FIG. 12.

This method may use a first unwinding roll to release the protective film, a first slot die coater to coat the nanomaterial dispersion, a tunnel oven for the thermal treatment, a second slot die coater, a second unwinding roll for coating of the transparent substrate, a roll laminator and a UV curing system, and a rewinding roll.

Example 4

Preparation of a Touch Sensor

Figure 13:
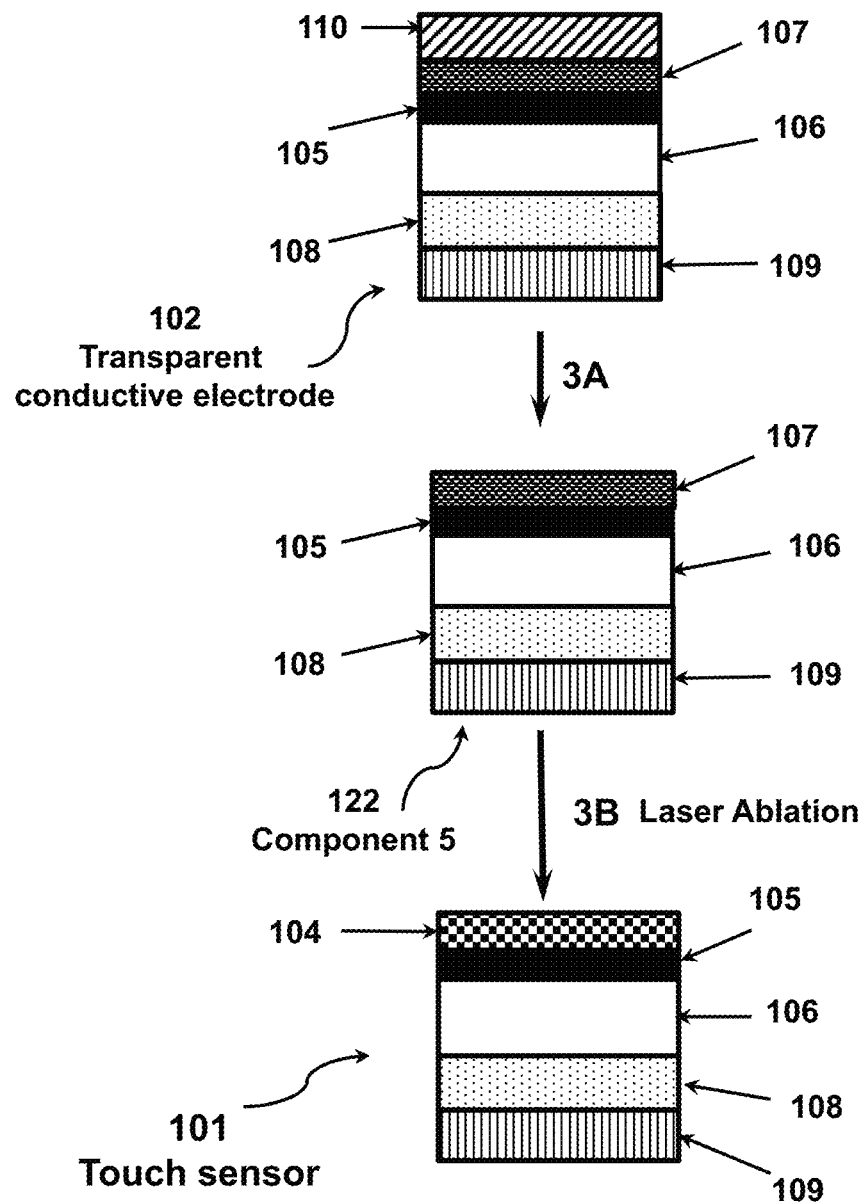
FIG. 13 is a drawing of an exemplary method of forming a system comprising an exemplary touch sensor. Features shown in this cross-sectional view of said system are not drawn to scale.

In this example, a method for preparation of a touch sensor is disclosed. This exemplary method is shown in FIG. 13. The following reference numerals are used in FIG. 13: touch sensor 101, transparent conductive electrode 102, sensor layer 104, lamination layer 105, transparent substrate 106, conductive nano-composite layer 107, hard coat 108, functional coating 109, protective film 110, and "component 5" 122.

Preparation of the transparent conductive electrode is disclosed above. First, the protective film may be peeled off of the transparent conductive electrode. Due to weak adhesion between the protective film and the conductive nano-composite layer, the protective film may easily be peeled off exposing the conductive nano-composite layer, as shown in FIG. 13-3A.

Then, the conductive nano-composite layer is patterned by using any suitable method, for example, a laser lithography method, as shown in FIG. 13-3B. Equipment for the laser lithography may commercially be available. For example, the laser lithography equipment from ShengXiong Laser Equipment Inc. (Dongguan, China) may provide a pattern controlled at line widths as small as about 20 micrometers with etching speeds of about 1500 millimeters/second (mm/s). In this method, the nanomaterial in the conductive nano-composite layer may absorb more laser energy than the nano-material layer polymer. This difference in absorption allows selective etching of the nanomaterial from the conductive nano-material layer. Depth of the laser etching (or ablation) may generally be in the range of 50 nanometers to 1 micrometer thickness where the conductive nano-composite layer is located.

After this laser patterning of the conductive nano-composite layer, a touch sensor comprising a sensor layer, a lamination layer, a transparent substrate, a hard coat and a functional coating may thereby be obtained.

Example 5

Preparation of an Encapsulated Touch Sensor

Figure 14:
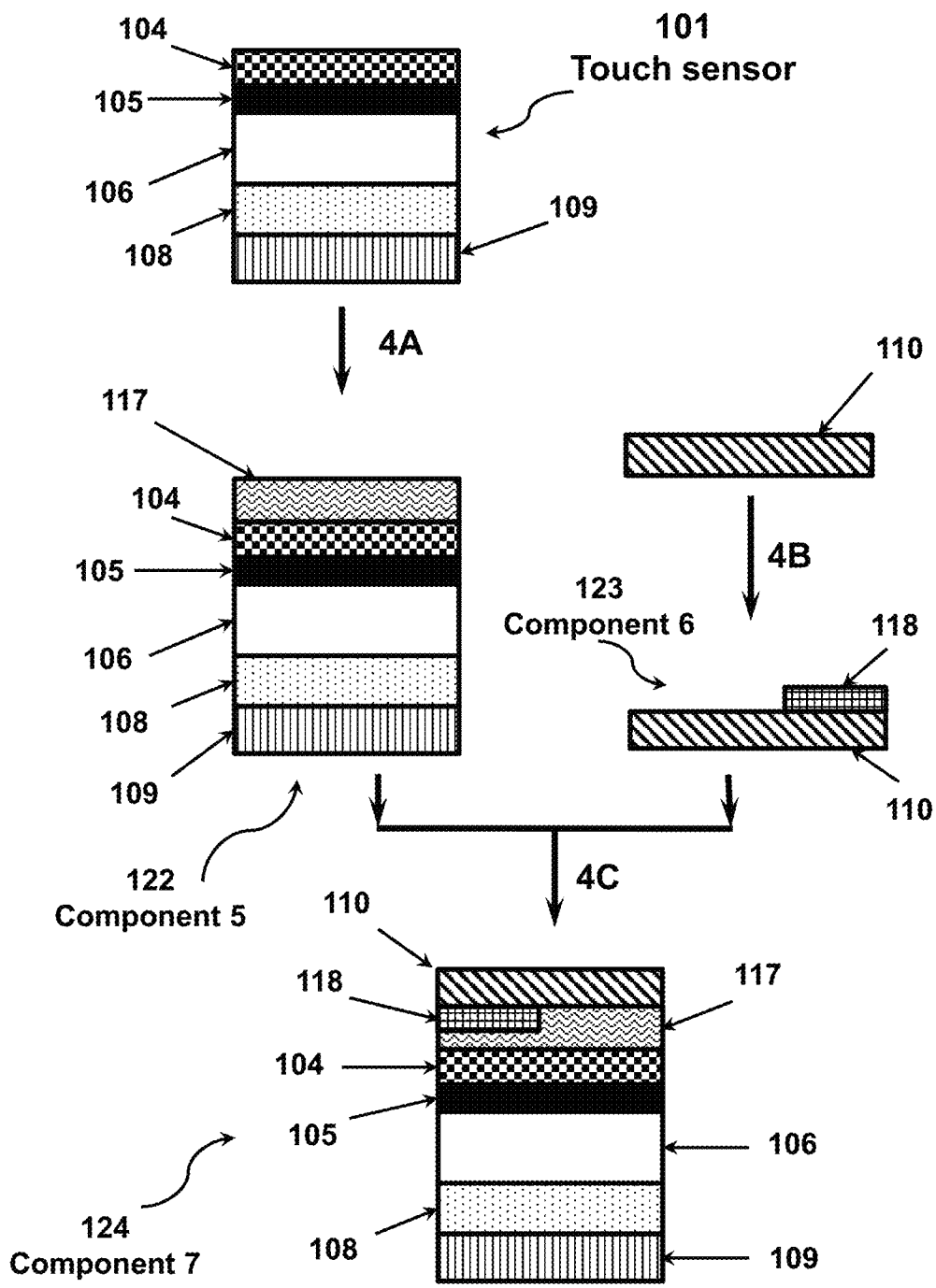
FIG. 14 is a drawing of an exemplary method of forming a component 5. Features shown in this cross-sectional view of the component 5 are not drawn to scale.
Figure 15:
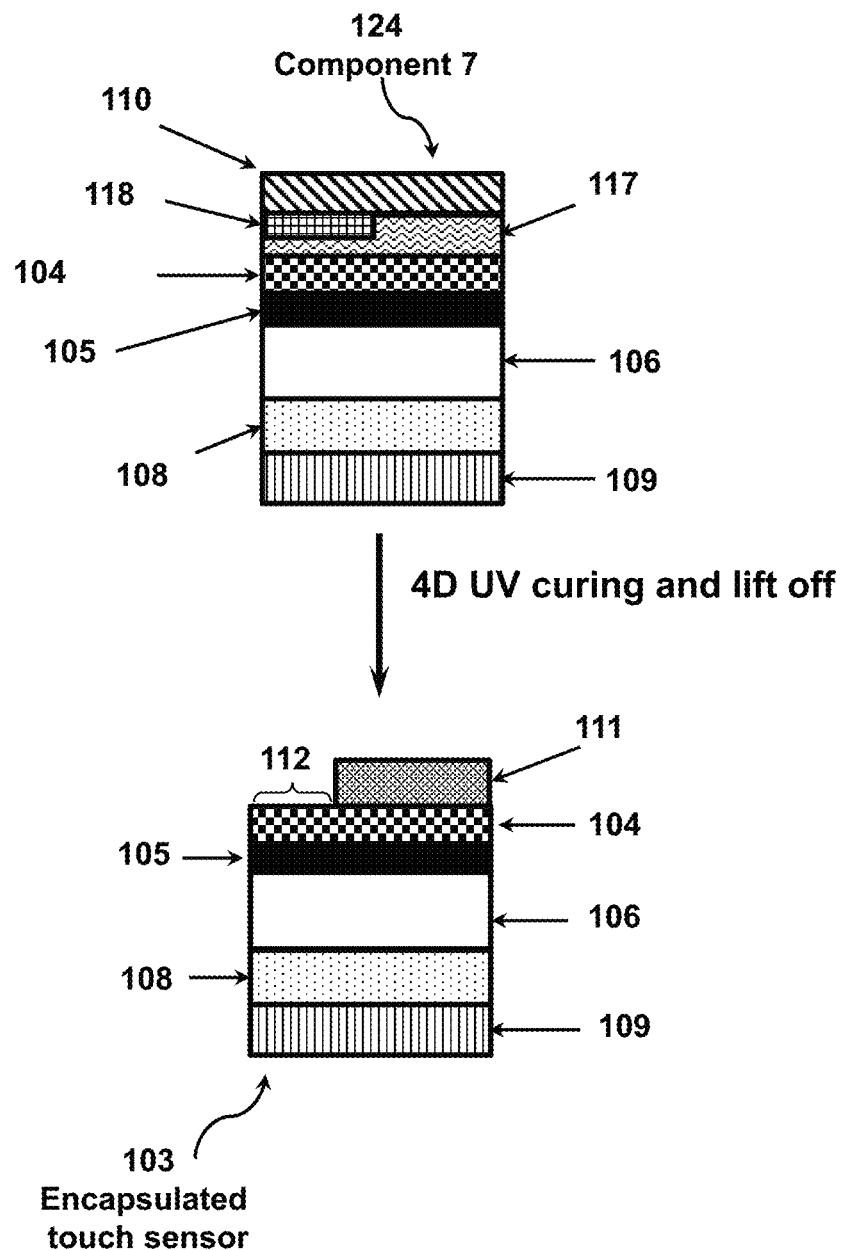
FIG. 15 is a drawing of an exemplary method of forming an exemplary encapsulated touch sensor. Features shown in this cross-sectional view of the component 5 are not drawn to scale.

In this example, a method for preparation of an encapsulated touch sensor is disclosed. This exemplary method is shown in FIGS. 14-15. The following reference numerals are used in FIGS. 14-15: touch sensor 101, encapsulated touch sensor 103, sensor layer 104, lamination layer 105, transparent substrate 106, hard coat 108, functional coating 109, protective film 110, encapsulation layer 111, bonding area 112, liquid encapsulation layer 117, primer layer 118, "component 5" 122, "component 6" 123, and "component 7" 124.

First, the sensor layer of the touch sensor prepared in Example 5 is coated with a liquid encapsulation layer as shown in FIG. 14-4A. A liquid formulation may be used to form the liquid encapsulation layer ("liquid encapsulation formulation"). Any suitable formulation may be used as the liquid encapsulation formulation. For example, the liquid lamination formulation may be used as the liquid encapsulation formulation.

The liquid encapsulation formulation may comprise a monomer or an oligomer, and a curing catalyst. For example, the liquid encapsulation formulation may comprise a mono-functional monomer, di-functional monomer, and tri-functional monomer, and a compatible catalyst. A composition of the liquid encapsulation formulation may comprise a monofunctional monomer (1%-50%), a di-functional monomer (10-80%), a tri-functional monomer (1-50%), a curing catalyst 1-6%, a leveling agent (0.1%-0.3%), and an antioxidant (0.1%-0.3%).

Examples of monomers that are useful in preparation of the liquid encapsulation formulation may be acrylate, methacrylate, acrylic acid, methacrylic acid, urethane acrylate, polyisocyanurate acrylate, acrylamide, methacrylamide, styrene, methyl styrene, polyester acrylate, polyurethane acrylate, polyimide acrylate, various epoxides, and a mixture thereof. Examples of the curing catalyst may be free radical catalysts such as benzoin, benzoin alkyl ethers, acylphosphine oxides, 1,1-diethoxyacetophenone, 1-benzoylcyclohexanol, benzophenone, 2,2-dimethoxy-2-phenylacetophenone, 2-methyl-1-[4-(methylthio)phenyl]-2-(4- morpholinyl)-1-propanone, 1-hydroxycyclohexyl phenyl ketone, and the like; and cationic UV curing catalysts such as diaryliodonium salt, dialkylphenacylsulfonium, ferrocenium salt, triarylsulfonium salt and the like; and mixtures of these free radical and/or cationic UV curing catalysts.

Thickness of the liquid encapsulation layer deposited on the sensor layer may vary in the range of 1 micrometer to 30 micrometers, or 5 micrometers to 10 micrometers. This coating layer may be formed by any suitable method, for example, slot die, comma coater, silk screen printing, gravure, and other method known in the art. For example, a slot die or comma coater method may be used. Equipment for such processes is commercially available.

After the coating with the liquid layer, a component 5 comprising the liquid encapsulation layer, a sensor layer, a lamination layer, a transparent substrate, a hard coat and a functional coating may thereby be obtained.

In a separate process, a protective film may be coated with a primer layer as shown in FIG. 14-4B. In this process, the primer layer may partially cover a surface of the protective film. A component 6 may thereby be obtained. A primer manufactured by PT Hutchins in China was used in the deposition of the primer layer. The primer may provide strong adhesion between the protective film and the encapsulation layer. When the protective film was lifted off, the encapsulation layer underneath the primer layer was removed together with the protective film so that the bonding area of the sensor may be formed.

Then, the component 5 may be combined with component 6 by placing the component 6 on a surface of the component 5 as shown in FIG. 14-4C. During this placement, a surface of the primer layer may face a surface of the liquid encapsulation layer such that when these two components are brought in touch with each other, forming the component 7.

Then, the liquid layer of the component 7 is cured into a solid layer by applying a UV curing method, as shown in FIG. 14-4D. Finally, the protective film may be peeled off from the component. An encapsulated touch sensor comprising an encapsulation layer, a bonding area, a sensor layer, a lamination layer, a transparent substrate, a hard coat, and a functional coating may thereby be prepared, as shown in FIG. 14.

Example 6

Preparation of a Transparent Conductive Electrode Comprising a Highly Transparent Poly(Ethylene Terephthalate) Substrate In this example, a highly transparent PET film was used as a transparent substrate. Thickness of this film was about 100 micrometers and its transmittance was about 92.5% at about 550 nm. Another highly thermal stable PET film was used as protective film in preparation of a transparent conductive electrode. This PET film also had a high thermal stability. Its linear thermal expansion rate was about 0.5% and about 1.0% at horizontal and vertical directions respectively. Silver nanowire was used as a nanomaterial. This silver nanowire, with an average diameter of about 35 nm, was purchased from Zhejiang Kechuang Advanced Material Co. Ltd. Monomer for the lamination liquid formulation was purchased from Sartomer Inc. These monomers included SR285, SR238 NS, SR351 NS, SR256, SR350 NS, SR508 NS, SR 601 NS, SR348 L, CN989 NS, SR368 NS, CN9010 NS. Catalysts and antioxidants used in this example Irgacure 754, Irgacure 184, and Irganox 1010 are purchased from BASF.

The conductive nanomaterial layer comprising the silver nanowire, and the liquid lamination layer were formed on the PET film by using a Mayer rod on a drawdown machine model FA-202D from FUAN enterprises in China. Thermal treatment of the coating layers was performed in a regular oven, model DGG-9070A from Shanghai Sengxing Equipment Inc. in China. UV curing of the liquid lamination layer, and the lamination liquid and conductive nanomaterial mixing layer was achieved by using a conveyor belt system made by Jiangsu RUCHAO Inc. in China, which was equipped with Fusion F300s as a UV light source. Transmittance of the transparent conductive electrode was measured by using a UV-VIS-NIR spectrometer. Sheet resistance of the transparent conductive electrode was measured by four probe method by R-CHEK model RC2175 from EDTM (Electronic Design to Market Inc.).

Figure 16:
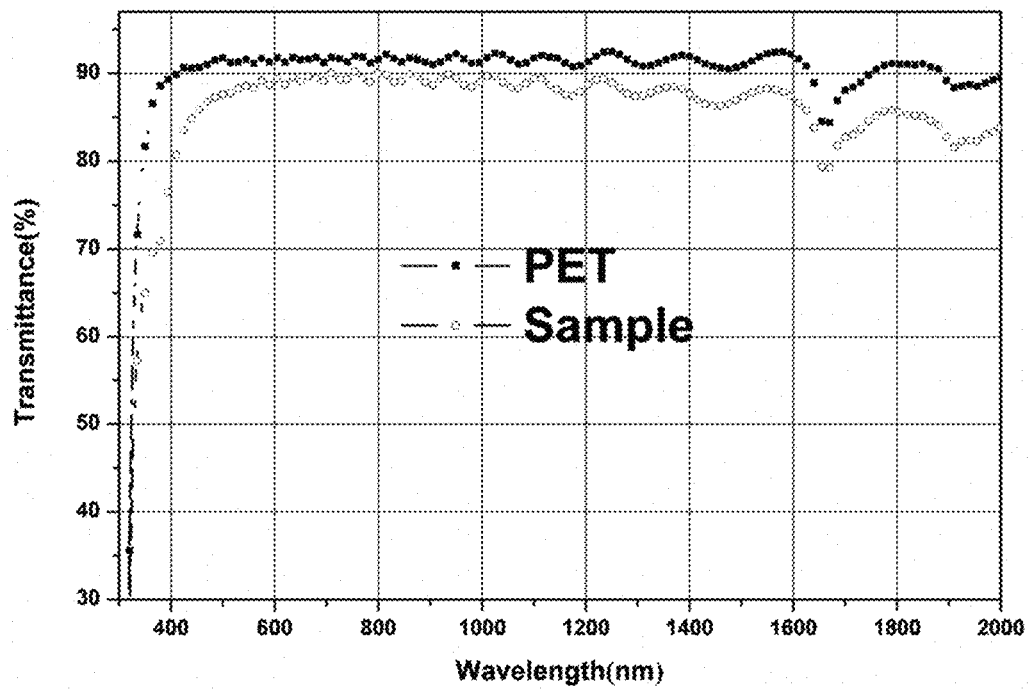
FIG. 16 is a graph showing optical transparencies of an exemplary system ("Sample") and the transparent substrate used in manufacturing of this system poly(ethylene terephthalate) ("PET").

The process disclosed in Example 1 was followed. A nanomaterial dispersion comprising about 3.5 mg/milliliter silver nanowire, methanol, and isopropanol was coated on a highly thermal stable PET film by using a #13 Mayer rod at a speed of about 150 mm/s. This coating was first air dried for about 1 minute, and then heated in an oven at about 150 degrees centigrade for about 5 minutes to form a component 1. After the component was cooled down, a liquid lamination layer was applied on the silver nanowire layer by using a #8 Mayer rod to form a component 2. Then, the component 2 was combined with another highly transparent PET film by a lamination process, as shown in FIG. 8-1E. Excess lamination liquid and trapped air within and/or between the layers were driven off by applying appropriate pressures on the combined components between two rolls. UV curing of the combined components at a belt speed of about 3 meter/minutes yielded a transparent conductive electrode comprising the PET protective film, the conductive nano-composite layer, the lamination layer, and the highly transparent PET substrate without hard coat. After the PET protective film is peeled off, the measured transmittance of the electrode structure as shown in FIG. 2 was about 89% at about 550 nm, as shown in FIG. 16, and the sheet resistance of the electrode was about 35±5 ohm/square. This electrode passed the adhesion test.

Example 7

Preparation of a Transparent Conductive Electrode Comprising a Highly Transparent Poly(Ethylene Terephthalate) Substrate with a Hard Coat This experiment was carried out in the same manner disclosed in Example 6, except that a one side hard coated PET film was used as a highly transparent substrate. This film was purchased from Zhong Yi Chemical, Inc. in China. Pencil hardness of this hard coat was 4H. Thickness of the PET film was about 100 micrometers.

The process disclosed in Example 2 was followed. A nanomaterial dispersion comprising about 3.5 mg/milliliter silver nanowire, methanol, and isopropanol was coated on a highly thermal stable PET film by using a #13 Mayer rod at a speed of about 150 mm/s. This coating was first air dried for about 1 minute, and then heated in an oven at about 150 degrees centigrade for about 5 minutes to form a component 1. The component was cooled down to room temperature within 10 minutes to form a component 1.

Figure 17:
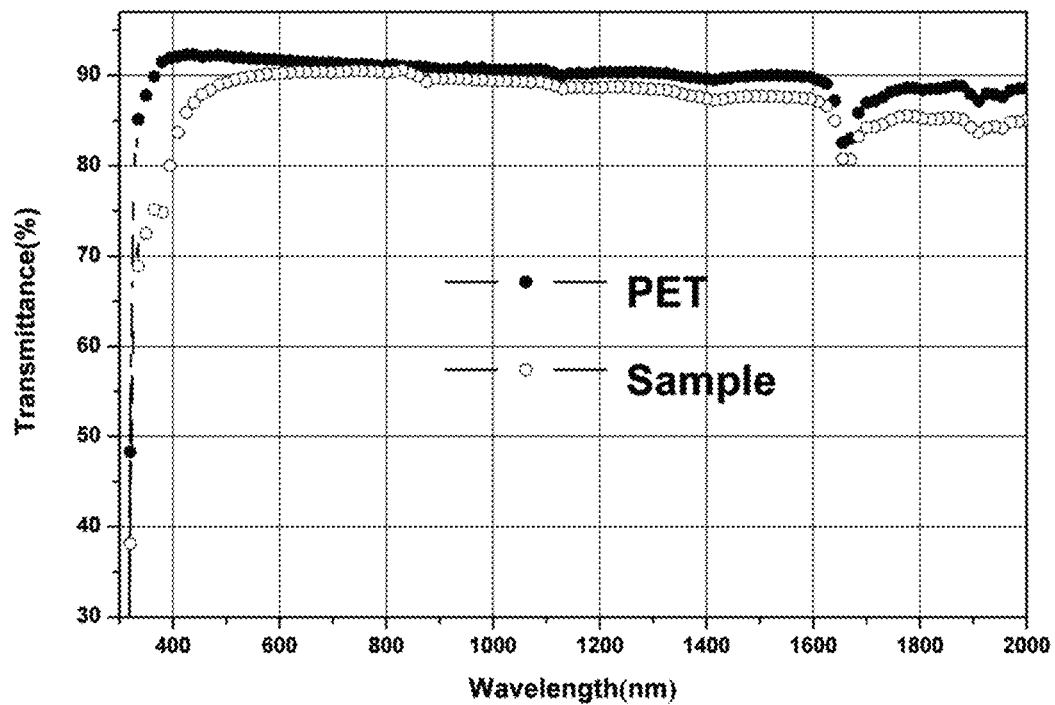
FIG. 17 is a graph showing optical transparency of an exemplary system ("Sample") and the transparent substrate used in manufacturing of this system poly(ethylene terephthalate) ("PET") that has a hard coat layer.

Another highly transparent PET film was first coated with a liquid lamination layer by using a #8 Mayer rod to form a component 4, and then combined with the component 1 by using a lamination process, as shown in FIG. 11-2E. After the lamination process, a UV curing of the combined components at a belt speed of about 3 meter/minute yielded a transparent conductive electrode comprising the PET protective film, the conductive nano-composite layer, the lamination layer, the highly transparent PET substrate, and the hard coat without additional functional coating. After the protective film was peeled off, the measured transmittance of the transparent conductive electrode was about 89% at about 550 nm as shown in FIG. 17 and its sheet resistance was about 35±5 ohm/square. This electrode passed the adhesion test.

Example 8

Preparation of a Transparent Conductive Electrode Comprising a Transparent Poly(Methacrylate) (PMMA) Substrate This experiment was carried out in the same manner disclosed in Example 6, except that a PMMA sheet was used as a highly transparent substrate. Its pencil hardness was about 3H. Thickness of the PMMA sheet was about 0.8 mm.

The process disclosed in Example 1 was followed. A silver nanowire dispersion containing about 3.5 mg per milliliter in a mixture of methanol and isopropanol was coated on a highly thermal stability PET film by using a #13 Mayer rod at a speed of about 150 mm/s. After the component was air dried for about 1 minutes, it was heated in an oven at about 150 degrees centigrade for about 5 minutes to form a component 1. After the component was cooled down, a liquid lamination layer was applied on the silver nanowire layer by using a #8 Mayer rod to form a component 2. The component 2 was then combined with the highly transparent PMMA sheet by using a lamination process to form component 3, as shown in FIG. 8-1E. Excess lamination liquid and trapped air within and/or between the layers were driven off by applying an appropriate pressure on the component between two rolls.

Figure 18:
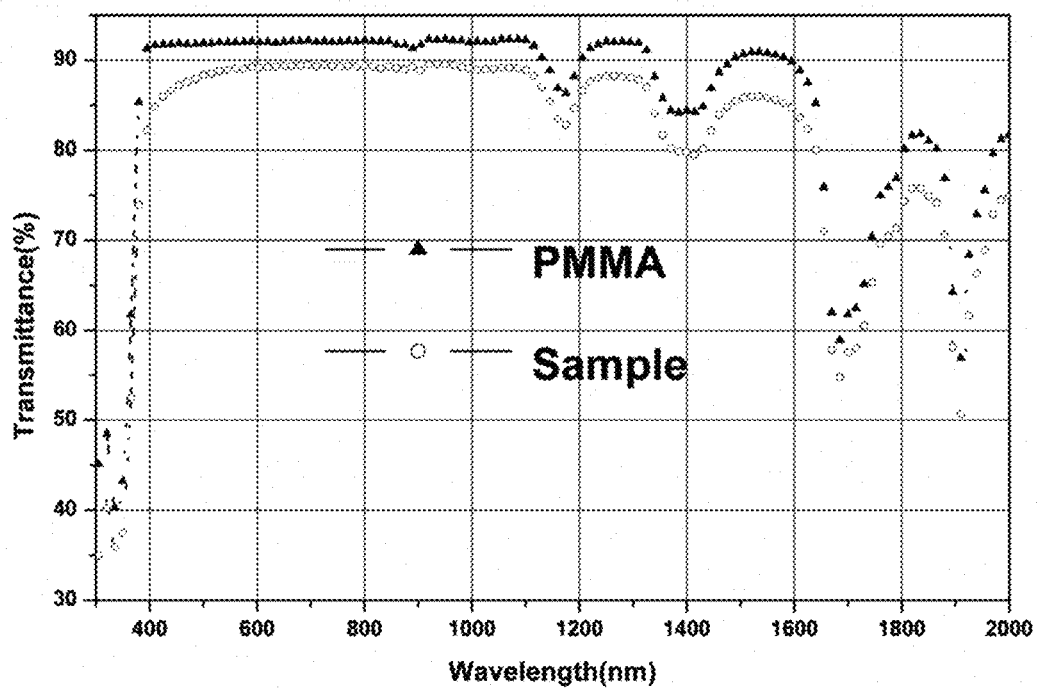
FIG. 18 is a graph showing optical transparency of an exemplary system ("Sample") and the transparent substrate used in manufacturing of this system ("PMMA").

A UV curing of the combined components at a belt speed of about 3 meter/minutes yielded a transparent conductive electrode comprising the PET protective film, the conductive nano-composite layer, the lamination layer, and the highly transparent PMMA substrate. After the protective film was peeled off, the measured transmittance was about 89% at about 550 nm as shown in FIG. 18. The sheet resistance of the electrode was about 35±5 ohm/square. The electrode passed the adhesion test.

Example 9

Repeatable Preparation of a Transparent Conductive Electrode Comprising a Transparent PMMA Substrate In this example, the process disclosed in Example 2 was followed. A silver nanowire dispersion containing about 3.5 mg nanowire per milliliter in a mixture of methanol and isopropanol was coated on a high thermal stability PET film by using a #13 Mayer rod at a speed of about 150 mm/s. After the component was air dried for about 1 minute, it was heated in an oven at about 150 degrees centigrade for about 5 minutes and cooled down to room temperature within 10 minutes to form a component 1.

Figure 19:
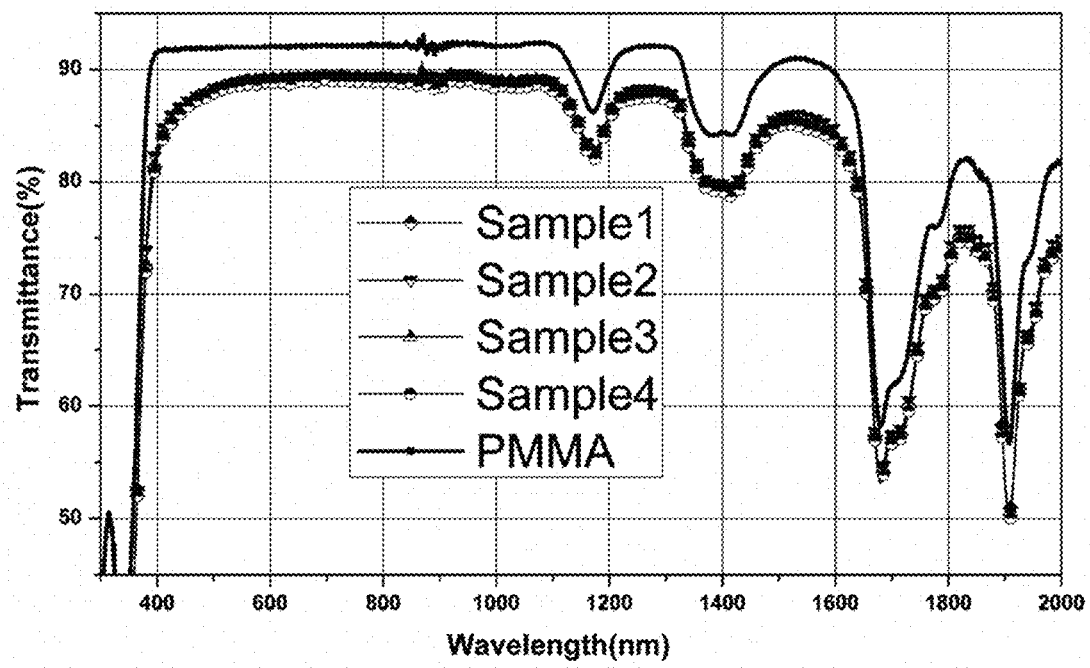
FIG. 19 is a graph showing optical transparency of four exemplary systems ("Sample 1" to "Sample 4") and the transparent substrate used in manufacturing of this system ("PMMA").

On a highly transparent PMMA sheet, a liquid lamination layer was applied by using a #8 Mayer rod to form a component 4 and combined with component 1 by the lamination process, as shown in FIG. 11-2E. After the lamination process, a UV curing of the combined components at a belt speed of about 3 meter/minute yielded a transparent conductive electrode comprising a PET protective film, a conductive nano-composite layer, a lamination layer, and a transparent PMMA substrate. Four samples were prepared following the same process. After the protective film was peeled off, the measured transmittance of these samples was about 89% at about 550 nm, as shown in FIG. 19. The sheet resistance of these samples was about 35±5 ohm/square. They passed the adhesion test.

Example 10

Environmental Stability of Transparent Conductive Electrodes Prepared by Using Various Liquid Lamination Formulations Samples were prepared in the same manner disclosed in Example 6, except that eight different lamination liquid formulations were used. After a UV curing, these formulations formed polymer lamination layers and the polymer composites in the conductive nano-composite layer. These polymers may be categorized into four different polymer types: aliphatic polyacrylate, aromatic polyacrylate, polyurethaneacrylate, and polyurethane acrylate-polyisocyanurate acrylate. Eight transparent conductive electrodes comprising a PET protective film, a nano-composite layer, a lamination layer, and a highly transparent PET substrate were prepared. Environmental tests were performed with half of the protective PET protective film peeled off (exposed area) and the other half of the protective PET still covering surface of the nano-composite layer (covered area). The sheet resistance of the exposed area of the electrodes was monitored by 4-probe method during the test. The PET film was peeled off from covered area after about 240 hours and the sheet resistance of the electrodes was measured. Table 1 shows results of environmental tests carried out at about 90% relative humidity and about 60 degrees centigrade. Table 2 shows high temperature tests carried out at about 80 degrees centigrade. The results shows that the samples with protective film covered area, the sheet resistance remain stable.

TABLE 1

Environmental tests of the transparent conductive electrodes prepared by using various lamination formulations. These tests are carried out at about 90% relative humidity and about 60 degrees centigrade for duration of 0, about 120 hours, and about 240 hours.

| Polymer type in lamination and nano-composite layer | sample | Exposed area(Ω/□) 0 h | 120 h | 240 h | Covered area(Ω/□) 240 h |
|---|---|---|---|---|---|
| Aliphatic | A-1 | 35 | 42 | 47 | 40 |
| polyacrylate | A-2 | 38 | 289 | 301 | 40 |
| Aromatic | B-1 | 36 | — | — | 40 |
| polyacrylate | B-2 | 33 | 1068 | — | 39 |
| Polyurethane | C-1 | 35 | 43 | 48 | 39 |
| acrylate | C-2 | 40 | 47 | 50 | 38 |
| Polyurethane- | D-1 | 42 | 61 | 64 | 42 |
| acrylate- | D-2 | 39 | 62 | 63 | 40 |
| polyisocyanurate acrylate | | | | | |

TABLE 2

Environmental tests of the transparent conductive electrodes prepared by using various lamination formulations. These tests are carried out at about 80 degrees centigrade for duration of 0, about 120 hours, and about 240 hours.

| Polymer type in lamination and nano-composite layer | Sample | Exposed area(Ω/□) | | | Covered area(Ω/□) |
|---|---|---|---|---|---|
| | | 0 h | 120 h | 240 h | 240 h |
| Aliphatic polyacrylate | A-1 | 41 | 41 | 42 | 37 |
| | A-2 | 36 | 93 | 70 | 40 |
| Aromatic polyacrylate | B-1 | 35 | 50 | 59 | 41 |
| | B-2 | 38 | 38 | 49 | 39 |
| Polyuretahneacrylate | C-1 | 44 | 54 | 49 | 41 |
| | C-2 | 37 | 53 | 67 | 40 |
| Polyurethane acrylate-polyisocyanurate acrylate | D-1 | 39 | 46 | 41 | 40 |
| | D-2 | 44 | 70 | 55 | 52 |

Example 11

Preparation of a Touch Sensor Comprising a Transparent PET Substrate

Figure 20:
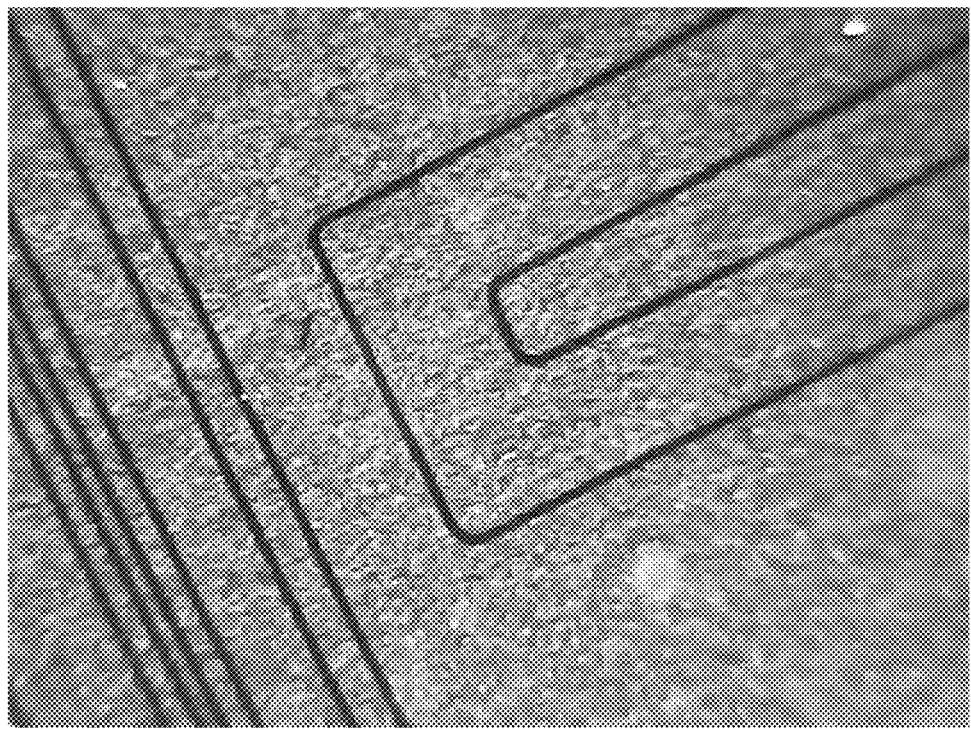
FIG. 20 is a microscopic photograph showing an exemplary touch sensor formed on a PET film. The width of each line is around 30 micrometers.

The transparent conductive electrode comprising a PET protective film a nano-composite layer, a lamination layer, and a highly transparent PET substrate was prepared as disclosed above. A sensor layer was formed by using this electrode by following the laser ablation process disclosed in Example 4. After the laser ablation process, a sensor layer pattern of a touch area and an edge conducting channel shown in FIG. 20 was obtained. The linewidth of the laser ablation was about 30 micrometers.

Example 12

Preparation of a Touch Sensor Comprising a Transparent PMMA Substrate

Figure 21:
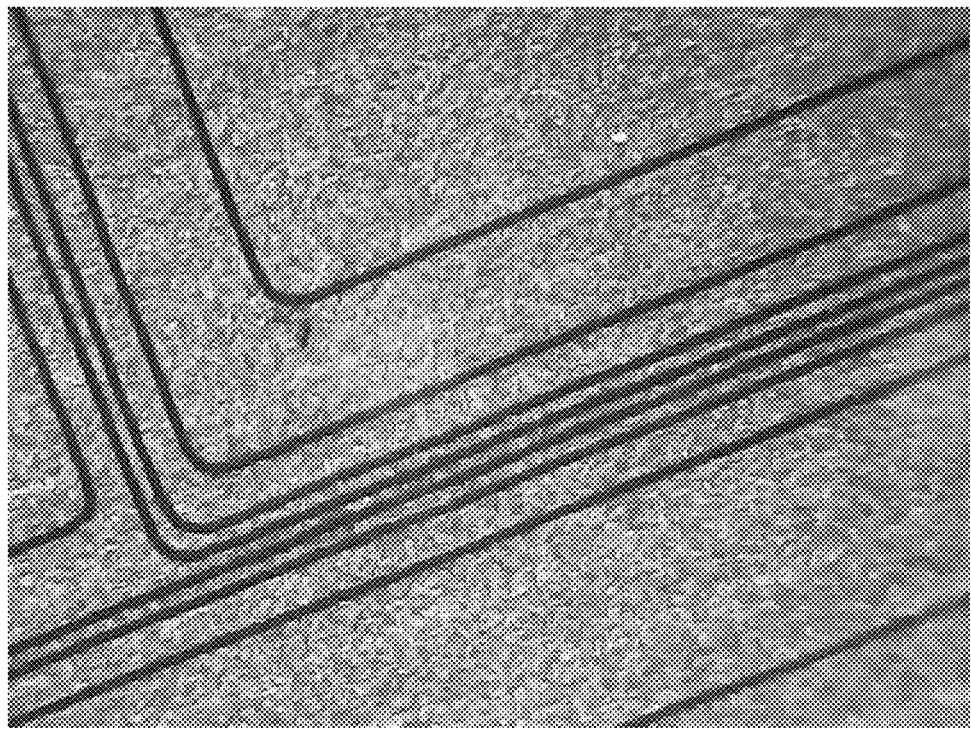
FIG. 21 is a microscopic photograph showing an exemplary touch sensor on a PMMA substrate. The width of each line is about 30 micrometers.

The transparent conductive electrode comprising a PET protective film a nano-composite layer, a lamination layer, and a transparent PPMMA substrate was prepared as disclosed in Example 8. A sensor layer was formed by using this electrode by following the laser ablation process disclosed in Example 4. After the laser ablation process, a sensor layer pattern of a touch area and an edge conducting channel shown in FIG. 21 was obtained. The linewidth of the laser ablation was about 30 micrometers.

Example 13

Figure 22:
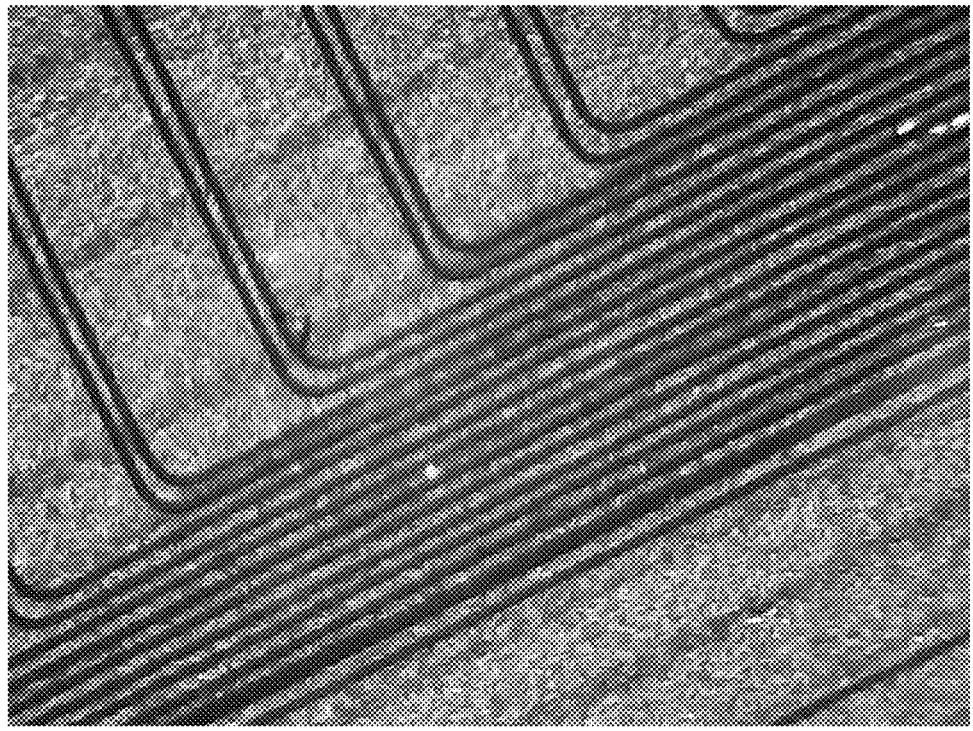
FIG. 22 is a microscopic photograph showing an exemplary bonding area of encapsulated touch sensor on a PET film. The width of each line is about 30 micrometers.

Preparation of an Encapsulated Touch Sensor Comprising a Transparent PET Substrate A touch sensor comprising a touch sensor layer, a lamination layer, a transparent PET substrate was prepared as disclosed in Example 12. The encapsulation layer was formed on this touch sensor by following the process disclosed in Example 5. An IC bonding area is shown on upper-left corner of the microscopic photograph of FIG. 22, and the encapsulated area is shown in the lower right side of the photograph.

Example 14

Encapsulated Nano-Composite Touch Sensor with PMMA as Transparent Substrate

Figure 23:
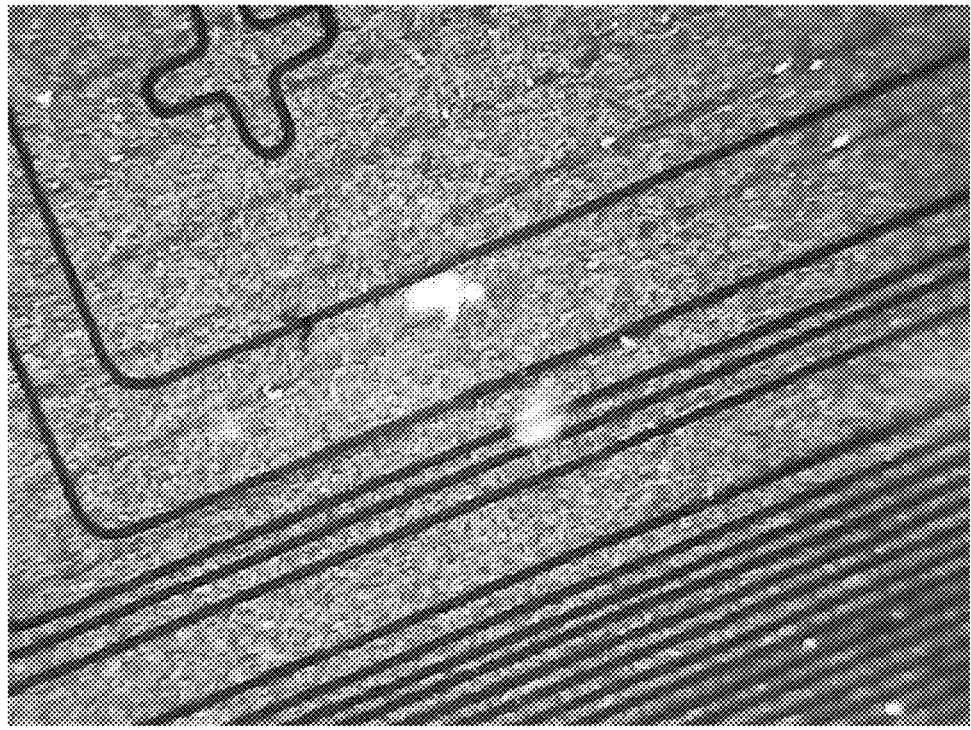
FIG. 23 is a microscopic photograph showing an exemplary bonding area of encapsulated touch sensor on a PMMA substrate. The width of each line is about 30 micrometers.

A touch sensor comprising a touch sensor layer, a lamination layer, a transparent PMMA substrate was prepared as disclosed in Example 13. The encapsulation layer was formed on this touch sensor by following the process disclosed in Example 5. An IC bonding area is shown on upper-left corner of the microscopic photograph of FIG. 23, and the encapsulated area is shown in the lower right side of the photograph.

Any combination of above features, systems, devices, and methods are within the scope of this disclosure.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An electronic system comprising:
a conductive nano-composite layer;
a lamination layer;
a transparent substrate; and
an encapsulation layer;
wherein the conductive nano-composite layer, the lamination layer, and the transparent substrate each have a front surface and a back surface;
wherein the lamination layer is formed on the front surface of the transparent substrate;
wherein the conductive nano-composite layer is formed on the front surface of the lamination layer;
wherein the lamination layer is positioned between the conductive nano-composite layer and the transparent substrate;
wherein the encapsulation layer is formed on the front surface of the conductive nano-composite layer;
wherein the conductive nano-composite layer is positioned between the encapsulation layer and the lamination layer;
wherein the encapsulation layer is a layer prepared by polymerization of a liquid encapsulation formulation comprising a mono-functional monomer, a di-functional monomer, a tri-functional monomer, a curing catalyst, a leveling agent, and an antioxidant;
wherein thickness of the lamination layer is in the range of more than 1 micrometer to 20 micrometers,
wherein the conductive nano-composite layer comprises a nanomaterial and a polymer, and
wherein the lamination layer comprises a polymer.

2. The system of claim 1, wherein both the conductive nano-composite layer and the lamination layer comprise the same polymer.

3. The system of claim 2, wherein both the conductive nano-composite layer and the lamination layer comprise polyacrylate, polymethacrylate, polyurethaneacrylate, polyisocyanurate acrylate, polyepoxide, or any combination thereof.

4. The system of claim 1, wherein the nanomaterial comprises a nanowire, a nanoribbon, a nanotube, a nanoparticle, or any combination thereof.

5. The system of claim 1, wherein the nanomaterial comprises a metal nanowire, a carbon nanotube, a graphene nanoribbon, or any combination thereof.

6. The system of claim 5, wherein the metal nanowire comprises a silver nanowire, a copper nanowire, a gold nanowire, a stainless steel nanowire, or any combination thereof.

7. The system of claim 1, wherein the transparent substrate comprises poly(ethylene terephthalate) (PET), poly(methyl methacrylate) (PMMA), polycarbonate (PC), poly(ethylene naphthalate) (PEN), cellulose triacetate (TAC), polyimide (PI), or any combination thereof.

8. The system of claim 1, further comprising a protective film, wherein the protective film is formed on the front surface of the conductive nano-composite layer, and wherein the conductive nano-composite layer is positioned between the protective film and the lamination layer.

9. The system of claim 1, further comprising a hard coat formed on the back surface of the transparent substrate, wherein the hard coat has a front surface and a back surface, and wherein the transparent substrate is positioned between the lamination layer and the hard coat.

10. The system of claim 9, further comprising a functional coating formed on the back surface of the hard coat, wherein the hard coat is positioned between the transparent substrate and the functional coating.

11. The system of claim 10, wherein the functional coating comprises an antireflective layer, an antiglare layer, or any combination thereof.

12. The system of claim 9, wherein the conductive nano-composite layer, the lamination layer, the transparent substrate, and the hard coat form a component; and wherein optical transparency of said component is higher than 88% at about 550 nm.

13. The system of claim 1, wherein the conductive nano-composite layer, the lamination layer, and the transparent substrate form a component; and wherein optical transparency of said component is higher than 88% at about 550 nm.

14. The system of claim 1, wherein the conductive nano-composite layer, the lamination layer, and the transparent substrate form a component; and wherein sheet resistance of said component is lower than 70 ohms per square after said component is heated at a relative humidity of about 90% and at a temperature of about 60 degrees in centigrade for about 240 hours, or heated at a temperature of about 80 degrees in centigrade for about 240 hours.

15. The system of claim 1, wherein the conductive nano-composite layer is patterned such that the system can detect a touch.

16. The system of claim 15, wherein the conductive nano-composite layer is patterned by removal of a material from the conductive nano-composite layer such that the system can detect a touch.

17. The system of claim 15, wherein the conductive nano-material layer comprises a nanomaterial and a polymer, and wherein the conductive nano-composite layer is patterned by removal of the nanomaterial from the conductive nano-composite layer with a predetermined amount in such a manner that the system can detect a touch.

18. The system of claim 17, wherein the nanomaterial comprises a silver nanowire.

19. The system of claim 15, wherein the patterning of the conductive nano-composite layer forms a touch sensor.

20. The system of claim 19, wherein the system is a display system comprising the touch sensor.

21. The system of claim 20, wherein the display system is a liquid crystal display, a light emitting display, a light emitting organic display, a plasma display, an electrochromic display, an electrophoretic display, an electrowetting display, an electrofluidic display, or an combination thereof.

22. The system of claim 1, further comprising an area formed on the front surface of the conductive nano-composite layer that has a configuration to allow bonding of an integrated circuit with the conductive nano-composite layer.

23. The system of claim 1, wherein the encapsulation layer comprises a polymer, wherein the lamination layer comprises a polymer, and wherein the encapsulation layer and the lamination layer comprise the same or different polymer.

24. The system of claim 23, wherein the encapsulation layer and the lamination layer comprise polyacrylate, polymethacrylate, polyurethaneacrylate, polyisocyanurate acrylate, polyepoxide, or any combination thereof.

25. The system of claim 1, wherein the conductive nano-composite layer comprises a polymer, wherein the lamination layer comprises a polymer, and wherein both the conductive nano-composite layer and the lamination layer comprise the same polymer.

26. The system of claim 25, wherein both the conductive nano-composite layer and the lamination layer comprise polyacrylate, polymethacrylate, polyurethaneacrylate, polyisocyanurate acrylate, polyepoxide, or any combination thereof.

27. A process for making the system of claim 1 comprising:
providing a first component by a process comprising forming an electrically conductive nano-composite layer on a first protective film,
providing a transparent substrate,
providing a liquid lamination layer between the first component and the transparent substrate,
bringing the liquid lamination layer in contact with the first component and the transparent substrate,
curing the liquid lamination layer, and
thereby preparing a transparent conductive electrode.

28. The process of claim 27, wherein the liquid lamination layer comprises monomers that have one or more UV curable functional groups.

29. The process of claim 28, wherein the monomers are acrylates, methacrylates, acrylic acids, methacrylic acids, urethane acrylates, acrylamides, methacrylamides, styrenes, methyl styrenes, isocyanurate acrylates, polyester acrylates, polyurethane acrylates, polyimide acrylates, epoxides, or a mixture thereof.

30. The process of claim 28, wherein the lamination liquid layer further comprises a catalyst suitable for a UV curing of the monomers and an antioxidant.

31. The process of claim 27, further comprising forming a hard coat on the transparent substrate before bringing the liquid lamination layer in contact with the first component and the transparent substrate.

32. The process of claim 31, further comprising forming a functional coating on the hard coat.

33. The process of claim 27, wherein the process of providing the first component further comprises forming the liquid lamination layer on the conductive nanomaterial layer.

34. The process of claim 27, further comprising bringing the liquid lamination layer in contact with the transparent substrate before bringing the liquid lamination layer in contact with the first component.

35. The process of claim 27, wherein the electrically conductive layer comprises a nanomaterial, and the process further comprising partially removing the nanomaterial with a predetermined amount from the electrically conductive nano-composite layer in such a manner that the system can detect a touch, and thereby forming a touch sensor.

36. The process of claim 35, wherein the nanomaterial is removed by using a laser lithography process.

37. The process of claim 35, further comprising:
providing a second component by a process comprising forming a primer layer on a second protective film, wherein the formed primer layer partially covers surface of the protective film;
providing a liquid encapsulation layer;
bringing the liquid encapsulation layer in contact with the second component and the touch sensor,
curing the liquid encapsulation layer,
peeling off the protective film, and
thereby preparing an encapsulated touch sensor.

38. The process of claim 37, wherein the liquid lamination layer and the liquid encapsulation layer comprise monomers that have one or more UV curable functional groups.

39. The process of claim 38, wherein the monomers are acrylates, methacrylates, acrylic acids, methacrylic acids, urethane acrylates, acrylamides, methacrylamides, styrenes, methyl styrenes, isocyanurate acrylates, polyester acrylates, polyurethane acrylates, polyimide acrylates, epoxides, or a mixture thereof.

40. The process of claim 38, wherein the liquid lamination layer and the liquid encapsulation layer further comprise a catalyst suitable for a UV curing of the monomer and an antioxidant.

41. The system of claim 1, wherein thickness of the conductive nano-composite layer is in the range of 5 nanometers to 1,000 nanometers.

42. The system of claim 41, wherein the conductive nano-composite layer, the lamination layer, and the transparent substrate form a component; and wherein optical transparency of said component is higher than 88% at about 550 nm.

43. The system of claim 1, wherein thickness of the conductive nano-composite layer is in the range of 30 nanometers to 100 nanometers.

44. The system of claim 1, wherein thickness of the transparent substrate is in the range of 0.01 millimeter to 6 millimeters.

45. The system of claim 44, wherein the thickness of the transparent substrate is in the range of 0.02 millimeter to 0.200 millimeter.

46. The system of claim 45, wherein thickness of the conductive nano-composite layer is in the range of 5 nanometers to 1,000 nanometers.

47. The system of claim 46, wherein the conductive nano-composite layer, the lamination layer, and the transparent substrate form a component; and wherein optical transparency of said component is higher than 88% at about 550 nm.

48. The system of claim 45, wherein thickness of the conductive nano-composite layer is in the range of 30 nanometers to 100 nanometers.

49. The system of claim 1, wherein the polymer of the lamination layer comprises polyacrylate, polymethacrylate, polyurethaneacrylate, polyisocyanurate acrylate, polyepoxide, or any combination thereof.

50. The system of claim 1, wherein thickness of the conductive nano-composite layer is in the range of 5 nanometers to 1,000 nanometers, and wherein thickness of the transparent substrate is in the range of 0.01 millimeter to 6 millimeters.

51. The system of claim 50, wherein the conductive nano-composite layer, the lamination layer, and the transparent substrate form a component; and wherein optical transparency of said component is higher than 88% at about 550 nm.

52. The system of claim 1, wherein concentration of the mono-functional monomer is in a range of 1% to 50%, concentration of the di-functional monomer is in a range of 10% to 80%, concentration of the tri-functional monomer is in a range of 1% to −50%, concentration of the curing catalyst is in a range of 1% to 6%, concentration of the leveling agent is in a range of 0.1% to 0.3%, and concentration of the antioxidant is in a range of 0.1% to 0.3%.

* * * * *